US010967690B2

United States Patent
Zona

(10) Patent No.: US 10,967,690 B2
(45) Date of Patent: Apr. 6, 2021

(54) HIGH MOBILITY ALL-TERRAIN VEHICLE (ATV), FOR EXAMPLE FOR EMERGENCY AND RESCUE CIVIL ACTIVITIES OR FOR ACTIVITIES IN THE AGRICULTURAL FIELD OR FOR EARTH MOVING ACTIVITIES

(71) Applicant: Zona Engineering & Design S.a.s. di Zona Mauro & C., Turin (IT)

(72) Inventor: Mauro Zona, Turin (IT)

(73) Assignee: ZONA ENGINEERING & DESIGN S.A.S. DI ZONA MAURO & C., Turin (IT)

( * ) Notice: Subject to any disclaimer, the term of this patent is extended or adjusted under 35 U.S.C. 154(b) by 0 days.

(21) Appl. No.: 16/087,893

(22) PCT Filed: Mar. 21, 2018

(86) PCT No.: PCT/IB2018/051899
§ 371 (c)(1),
(2) Date: Sep. 24, 2018

(87) PCT Pub. No.: WO2018/172956
PCT Pub. Date: Sep. 27, 2018

(65) Prior Publication Data
US 2020/0009931 A1    Jan. 9, 2020

(30) Foreign Application Priority Data

Mar. 24, 2017    (IT) .................. 102017000032682

(51) Int. Cl.
*B62D 55/065*    (2006.01)
*B62D 55/084*    (2006.01)
(Continued)

(52) U.S. Cl.
CPC ........... *B60F 3/0015* (2013.01); *B25J 9/0087* (2013.01); *B25J 15/0066* (2013.01); *B60K 1/00* (2013.01);
(Continued)

(58) Field of Classification Search
CPC .. B62D 55/065; B62D 55/084; B62D 55/116; B62D 55/0655; B60Y 2200/42;
(Continued)

(56) References Cited

U.S. PATENT DOCUMENTS 3,664,448 A * 5/1972 Hudis ...................... B60P 1/02
                                                                 180/9.46
3,792,745 A * 2/1974 Files ...................... B62D 11/20
                                                                 180/9.46
(Continued)

FOREIGN PATENT DOCUMENTS

CA          2899780 A1 *   8/2014   ........... B62D 55/075
WO       2014182216 A1    11/2014
(Continued)

OTHER PUBLICATIONS

International Search Report and Written Opinion of the International Searching Authority for PCT/IB2018/051899 dated Jul. 17, 2018.

*Primary Examiner* — Anne Marie M Boehler
(74) *Attorney, Agent, or Firm* — Heslin Rothenberg Farley & Mesiti P.C.; Victor A. Cardona, Esq.

(57) ABSTRACT

A large-scale, high-mobility all-terrain vehicle is equipped with at least two articulated front legs and at least two articulated rear legs. Each articulated leg is connected to the vehicle structure about two mutually orthogonal axes to allow a variation of the track width distance between each pair of track assemblies and a variation of the height of the vehicle structure with respect to each track assembly. Each
(Continued)

track assembly is connected to the respective leg about a horizontal transverse axis and about a vertical axis, and about a longitudinal axis. The vehicle structure has a front module and a rear module articulated about a longitudinal axis and a driving cabin that can be rotated downwards to allow ample visibility of the ground in front. The track assemblies are connected to the respective articulated legs by quick coupling devices.

16 Claims, 23 Drawing Sheets

(51) Int. Cl.
| | | |
|---|---|---|
| *B62D 55/116* | (2006.01) | |
| *B60F 3/00* | (2006.01) | |
| *B25J 9/00* | (2006.01) | |
| *B25J 15/00* | (2006.01) | |
| *B60K 1/00* | (2006.01) | |
| *B60K 6/26* | (2007.10) | |
| *B63B 1/30* | (2006.01) | |
| *B63H 11/02* | (2006.01) | |
| *H02K 7/00* | (2006.01) | |
| *E01H 5/06* | (2006.01) | |
| *E01H 5/09* | (2006.01) | |
| *E02F 3/96* | (2006.01) | |

(52) U.S. Cl.
CPC .............. *B60K 6/26* (2013.01); *B62D 55/065* (2013.01); *B62D 55/084* (2013.01); *B62D 55/116* (2013.01); *B63B 1/30* (2013.01); *B63H 11/02* (2013.01); *H02K 7/006* (2013.01); *B60Y 2200/22* (2013.01); *B60Y 2200/42* (2013.01); *B60Y 2200/46* (2013.01); *B60Y 2200/92* (2013.01); *E01H 5/061* (2013.01); *E01H 5/09* (2013.01); *E02F 3/96* (2013.01)

(58) Field of Classification Search
CPC .. B60Y 2200/46; B60F 3/0015; B25J 9/0087; B25J 15/0066
USPC .............. 180/9.46, 9.5, 9.52, 9.32, 9.42, 9.1
See application file for complete search history.

(56) References Cited

U.S. PATENT DOCUMENTS

| | | | | |
|---|---|---|---|---|
| 3,900,077 | A | * | 8/1975 | Gee .................... B66C 5/10 |
| | | | | 180/9.46 |
| 3,970,405 | A | | 7/1976 | Swisher, Jr. et al. |
| 4,241,803 | A | * | 12/1980 | Lauber ................ B60G 17/00 |
| | | | | 180/8.1 |
| 4,558,758 | A | * | 12/1985 | Littman ............... B62D 7/026 |
| | | | | 180/236 |
| 4,823,852 | A | * | 4/1989 | Langford ............ A01G 23/081 |
| | | | | 144/4.1 |
| 6,823,953 | B2 | * | 11/2004 | Castrignano ....... B62D 55/0842 |
| | | | | 180/9.1 |
| 6,983,708 | B1 | * | 1/2006 | Burg .................... B63B 1/12 |
| | | | | 114/67 R |
| 9,493,046 | B2 | * | 11/2016 | Dick ................... B60F 3/0015 |
| 9,969,427 | B1 | * | 5/2018 | Engels ................. B62D 7/1509 |
| 2011/0236129 | A1 | | 9/2011 | Guntert, Jr. et al. |
| 2013/0000996 | A1 | * | 1/2013 | Miller ................. E01C 23/088 |
| | | | | 180/9.46 |
| 2015/0354149 | A1 | * | 12/2015 | Dahm .................. B62D 9/00 |
| | | | | 404/98 |
| 2016/0061327 | A1 | * | 3/2016 | Farr .................... E01C 19/42 |
| | | | | 92/171.1 |
| 2016/0244096 | A1 | * | 8/2016 | Klein .................. B62D 55/0655 |
| 2020/0216125 | A1 | * | 7/2020 | Dou .................... B62D 55/104 |

FOREIGN PATENT DOCUMENTS

| | | | |
|---|---|---|---|
| WO | 2015079418 A2 | 6/2015 | |
| WO | WO-2016129139 A1 * | 8/2016 | ........... B62D 55/116 |

* cited by examiner

HIGH MOBILITY ALL-TERRAIN VEHICLE (ATV), FOR EXAMPLE FOR EMERGENCY AND RESCUE CIVIL ACTIVITIES OR FOR ACTIVITIES IN THE AGRICULTURAL FIELD OR FOR EARTH MOVING ACTIVITIES

CROSS REFERENCE TO RELATED APPLICATIONS

This application is a 371 national stage of PCT International Application No. PCT/IB2018/051899, filed on Mar. 21, 2018, which claims priority to Italian Patent Application No. 102017000032682 filed on Mar. 24, 2017, the entire disclosures of which are incorporated herein by reference.

FIELD OF THE INVENTION

The present invention relates to vehicles of the high mobility ATV ("All-Terrain Vehicle") type, usable, for example, in emergency and rescue civil activities, or in the agricultural field, or in earth-moving activities or the like. In one aspect, the invention is also applicable to the field of amphibious vehicles.

PRIOR ART

Various types of vehicles of the type indicated above have been proposed in the past. None of the vehicles proposed up to now, however, can effectively solve the problem of an intervention in areas that are extremely difficult to reach, for example, in the case of emergency situations following natural disasters such as earthquakes, landslides and floods.

OBJECT OF THE INVENTION

The object of the present invention is to produce a vehicle that is able to optimally satisfy the need indicated above.

Another object of the invention is to achieve the aforesaid objective with a vehicle whose configuration is rapidly adaptable to any specific use.

A further object is to provide a vehicle of the type specified above that combines the characteristics of a high-mobility vehicle with those of a vehicle with a high capacity for loading people and/or material, also equipped with a high efficiency propulsion system.

An additional object is to provide a vehicle that can also be configured as an amphibious vehicle and arranged to easily advance in hostile environments, preserving the safety of the occupants of the vehicle.

A further object is to provide a vehicle of the type indicated above that allows the occupants to perform operations on the ground, for example, operations to displace boulders and debris or excavations in the snow, allowing the operators to remain inside the vehicle.

SUMMARY OF THE INVENTION

In view of achieving the aforesaid objects, the present invention relates to a high mobility all-terrain vehicle, comprising a vehicle structure comprising at least one module for transporting people and/or material, and at least two front legs and at least two rear legs articulated to the vehicle structure and bearing respective track assemblies, said vehicle being further characterized in that:
  each track assembly carries a respective electric motor for actuating the track,
  each of said articulated front and rear legs comprises one or more articulated segments, and has a first end portion articulated to the vehicle structure and a second end portion articulated to the respective track assembly,
  the aforesaid first end portion of each leg is connected in an articulated manner to the vehicle structure both about a first axis, directed vertically with respect to the vehicle structure, and about a second axis, directed horizontally with respect to the vehicle structure,
  an actuator device for rotating the leg about said first axis is associated with said first axis, which can be actuated to vary the position of the leg about said first axis and to vary with the track width distance of the respective track assembly with respect to the median longitudinal plane of the vehicle structure,
  an actuator device for rotating the leg about said second axis is associated with said second axis, which can be actuated to vary the position of the leg about said second axis to vary accordingly the height of the vehicle structure with respect to the track assembly carried by said leg,
  the aforesaid second end portion of each leg is connected in an articulated manner to a supporting structure of the respective track assembly, both about a third axis, horizontally directed, and about a fourth axis, vertically and orthogonally directed compared to said third axis, and about a fifth axis, directed parallelly to the longitudinal direction of the track assembly,
  the articulation of the track assembly about said third horizontal axis is preferably a freely rotatable articulation, which allows the track assembly to engage in pitching-free movement to follow the contour of the ground while the vehicle is moving,
  an actuator device for rotating the track assembly about said fourth axis is associated with said vertical fourth axis, which can be actuated to vary the position of the track assembly about said fourth axis, for example, to maintain the track assembly parallel to the vertical longitudinal plane of the structure of the vehicle when the track width distance of the track assembly with respect to the aforesaid median plane is varied,
  the articulation of the track assembly about said fifth longitudinal axis is a freely rotatable articulation, or an articulation with which one or more oscillating elastic and shock-absorbing devices are associated, or an articulation controlled by a respective actuator device.

According to a further preferred characteristic, the aforesaid second end of each articulated leg is connected to the respective track assembly by means of a quick coupling device, which allows easy replacement of each track assembly with a wheel assembly, in order to reconfigure the vehicle as a vehicle on wheels.

In a preferred embodiment, the structure of the vehicle comprises a front module, provided with the aforesaid front legs, and a rear module provided with the aforesaid rear legs. The front module and the rear module are connected in an articulated manner about a single longitudinal axis.

According to a further preferred characteristic, the vehicle is provided at the front with at least two robotized manipulator arms having several articulation axes and/or telescopic arms terminating with working tools, for example, in the form of grippers, or support members for snow turbines, snowploughs, excavation blades or shovels and the like.

According to another preferred characteristic, the vehicle structure is configured as a floating hull and the vehicle is, therefore, suitable for use as an amphibious vehicle configured to operate both on land and in water, in this second case using hydrojet propulsion.

The vehicle according to the invention is preferably a large vehicle, with articulated legs that have a maximum extension in the order of 2-3 m.

Thanks to the articulated legs and the various degrees of freedom with which they are equipped, the vehicle can easily advance on terrains with a degree of extreme difficulty, and is able to cross water courses with the track assemblies advancing on the bottom of the water course, while the structure of the vehicle remains above the water surface, exploiting the maximum extension of the articulated legs.

In a preferred embodiment, the vehicle is equipped with a system of sensors associated with at least some of said articulated legs, suitable for detecting the contour of the ground in front of the vehicle during movement. An electronic control unit is configured to receive output signals from said sensor devices and to control the actuating devices associated with the articulated legs in order to automatically and dynamically adapt the attitude of the vehicle to the configuration of the ground detected by the aforesaid sensor devices, and also as a function of one or more operating parameters, including the speed of movement of the vehicle relative to the ground.

More specifically, in this embodiment, the articulated legs of the vehicle serve both as the suspension function of the vehicle, and the function of allowing self-levelling of the vehicle while traveling on uneven terrain. The vehicle is associated with one or more sensor devices 100 (see FIGS. 1 and 20) in which a device 100 is mounted above the driver's cabin), produced with any known technology, for example, "lidar" or radar or ultrasound laser detectors. Examples of sensor devices that can be used are the "TacFlir 280-HD" device by the company FLIR Systems, Inc., or the "Velodyne LiDAR" device of the company Velodyne LiDAR, Inc. It is also possible to associate a device of this type with each track assembly. The aforesaid devices are able to map the terrain in front of the vehicle according to a virtual path, for example, twice the width of each track assembly and of a maximum length not exceeding 30 m, for example. Said map, of three-dimensional configuration, is characterized by an altimetric profile of the longitudinal section and by an altimetric profile of the cross-section. The output signals from the sensors 100 are sent to the electronic control unit of which the vehicle is equipped, which consequently controls the actuators associated with each articulated leg. The electronic control unit is configured to control the actuators associated with the articulated legs of the vehicle both according to the output signals from the sensors 100 that define the contour of the terrain in front of the vehicle, and according to the advancing speed of the vehicle itself. The electronic control unit is thus able to control the actuators so that the articulated legs of the vehicle are arranged in an attitude that depends, according to a predetermined logic, on the contour of the terrain. For example, the articulated legs can be controlled so as to keep the vehicle cabin substantially at a constant level and with a stable horizontal attitude while the vehicle moves on the ground. Preferably, the electronic control system comprises an inertial platform that records the acceleration values along three mutually orthogonal axes and the rotations about said axes, and includes a control system programmed to preserve (or at least perturb to the minimum extent) the horizontal attitude of the entire body of the vehicle. The control system operates by comparing the output signals from the sensor system 100 with the movement limits of the articulated legs carrying the track assemblies of the vehicle. If, for example, the system detects that the compensation of the attitude is impossible as the stroke bottom of one the segments forming the articulated legs of the vehicle has been reached, the motion of the vehicle is instructed to stop, or slow down, up to a minimum value allowed. As can be seen, therefore, the vehicle control system is able to operate according to a predictive logic that allows the vehicle suspension system to operate non-passively as a result of the received stresses, but actively, thanks to a prediction of future stresses. It should also be noted that the maximum speed that can be reached by the vehicle with respect to the ground, in a control mode of the type indicated above, is limited by the need to allow the sensors 100 to detect the contour of the ground in front of the vehicle. The distance of 30 m—indicated above—for the range of action of the sensors 100 is not random. If it is hypothesized that the reaction time of the movement system of the single wheel is in the order of 1 second, with a sampling time of the sensors 100 of 0.001 seconds, then the maximum speed that can be reached by the vehicle is 108 Km/h (30×3600). This speed is fully adequate for all-terrain vehicles of the type forming the subject of the present invention. Of course, the above is also valid if wheel assemblies are mounted to replace the track assemblies.

Again, in the case of a preferred embodiment, each track assembly comprises a supporting structure including two parallel and spaced-apart side walls, rigidly connected to each other, an electric motor for actuating the track, having an inner stator and an outer rotor surrounding the stator, the stator of the electric motor being rigidly connected to a stationary shaft, having ends projecting from opposite sides of the electric motor and rigidly connected to said side walls of the track assembly, close to the front end of the track assembly. The rotor of the electric motor is rotatably connected with at least one front wheel for dragging the track, arranged coaxially with said rotor. A closed-loop track is engaged about said at least one front wheel driven by the electric motor, about at least one rear wheel freely rotatably mounted on said supporting structure at the rear end of the track assembly, as well as on a set of freely rotatable wheels carried by said supporting structure on each side of the track assembly. Preferably, a set of upper wheels, freely rotatably mounted, each on a respective side wall of the track assembly, and a set of lower wheels, each of which are vertically pivoting from the respective side wall of the track assembly, is provided.

Further characteristics and advantages of the invention are indicated in the attached claims.

DETAILED DESCRIPTION OF PREFERRED EMBODIMENTS

The present invention will now be described with reference to the attached drawings, provided purely by way of non-limiting example, in which:

FIG. 1 is a perspective view of an embodiment example of the vehicle according to the invention, FIG. 2 is a perspective view on an enlarged scale of an articulated leg of the vehicle of FIG. 1, provided with the respective track assembly, FIG. 3 is an additional perspective view of the articulated leg and of the respective track assembly, in a different relative position, FIG. 4 is an additional partially cross-sectioned perspective view of the articulated leg and of the track assembly, FIG. 5 is an enlarged scale view of a detail of the connection between the articulated leg and the vehicle structure, FIG. 6 is a partially cross-sectioned perspective view of the detail of the connection between the articulated leg and the track assembly, FIG. 7 is a perspective view from below showing the quick connection device, for coupling the lower end of the articulated leg with the track assembly, FIG. 8 is a partially cross-sectioned perspective view of the detail of the front end of the track assembly, FIG. 9 is a perspective view from above of the vehicle body, devoid of articulated legs, FIG. 10 is an exploded perspective view of the body of FIG. 9, FIG. 11 is a perspective view from below of the vehicle of FIG. 1, FIG. 12 is a side view of the vehicle of FIG. 1, FIGS. 13 and 14 are side views on an enlarged scale of the front end of the vehicle, in two different operating conditions of the nose of the body, FIG. 15 is a perspective view of the front module of the vehicle of FIG. 1, FIG. 16 is a rear perspective view of the module of FIG. 15, FIG. 17 is an additional cross-sectioned perspective view of the vehicle according to the invention, FIGS. 18 and 19 are perspective views that illustrate a manipulator arm, of which the vehicle of the invention is provided, in two different operating conditions, FIG. 20 illustrates the vehicle according to the invention in a variant of FIG. 1, and FIGS. 21 and 22 show a variant of the track assembly in two different operating conditions, and FIG. 23 is a perspective view of an articulated leg 8, showing the replacement of a track assembly 9 with a wheel assembly 9'.

The drawings refer to examples, provided herein by way of non-limiting example, of some preferred embodiments of the invention. With reference to FIG. 1, numeral 1 indicates—in its entirety—a high-mobility, large-scale ATV, designed to operate on terrains of extreme difficulty in emergency and rescue activities. The vehicle comprises a body 2 including a front module 3 and a rear module 4 freely articulated to each other about a single longitudinal axis 5 (see FIG. 12). The vehicle is provided with a front driving cabin 6, which in the preferred embodiment, is pivotably mounted on the front end of the front module 3 between a normal cruising position, illustrated in FIGS. 1 and 12, 13, and a position rotated downwards (see FIG. 14) in which the crew involved in the maneuvers maintain full visibility on the ground in front of the vehicle even when the vehicle assumes a strongly inclined upward attitude. In FIG. 14, the reference number 7 indicates the articulation axis of the supporting structure of the driving cabin 6 with respect to the structure of the front module 3. The position of the driving cabin 6 about the axis 7 is controlled by an electric or fluid actuator (not shown) of any known type. Returning to FIG. 1, the vehicle 1, in the embodiment illustrated herein by way of example, is equipped with four articulated legs 8: two front legs, connected in an articulated manner to the front module 3 of the body, and two rear legs, connected in an articulated manner to the rear module 4 of the body. Each articulated leg has a first end portion articulated to the vehicle structure, and a second end portion connected in an articulated manner to a respective track assembly 9, the structure of which will be illustrated in detail below.

Referring now to FIG. 2, each articulated leg 8 has, in the embodiment described herein, a single segment connected in an articulated manner at its ends to the vehicle structure and to the respective track assembly. However, the case in which each articulated leg 8 is constituted by two or more segments articulated to each other in series is by no means excluded.

With reference to FIG. 2 and also to FIGS. 9 and 10, the articulated legs 8 are connected to four modules 10 (FIG. 10) removably connected by means of coupling devices of any known type (not illustrated) to the two sides of the front module 3 and the rear module 4 of the vehicle body 2.

Referring now in particular to FIG. 5, each module 10, rigidly connected to the vehicle structure, supports an intermediate support member 12 in a freely rotatable manner about a first axis 11, vertically directed with respect to the vehicle structure. The structure of the leg 8 is, in turn, connected in an articulated manner to the intermediate support 12 about a second axis 13 directed orthogonally with respect to the first axis 11.

An electric or fluid actuator device of any known type is associated with the first axis 11, for controlling a rotation of the intermediate support 12 about the first axis 11. In the example illustrated in the drawings, the actuator device associated with the first axis 11 comprises two cylinders 14, electrically- or fluidly-operated, each having a body carried by the fixed structure of the vehicle and a stem 14a connected in an articulated manner to a respective ear 15 of the intermediate support 12. The illustrated example shows the use of two actuator cylinders 14, with the object of providing a greater actuating power, but it is, however, evident that the actuator device could comprise a single actuator cylinder, or be formed of any other type of actuator, for example, an electric motor connected by means of a transmission of gears to a shaft rigidly connected to the intermediate support 12.

In a similar manner, the rotation of the articulated leg 8 about the second axis 13 is controlled by an actuator device of any known type, which in the illustrated case takes the form of two actuating cylinders 16 each having an end 16a articulated to the intermediate support 12 and, on the opposite side, a stem 16b having an end 16c articulated to the structure of the leg 8.

The actuator devices 14, 16, like all the remaining actuating devices associated with the articulated legs 8 are controlled by one or more electronic control units of which the vehicle is provided, as a function of signals imparted manually by the driver-operator and/or also, in an automatic driving mode, as a function of signals emitted by sensors associated with the vehicle structure and/or articulated legs, and configured to detect the terrain contour in front of the vehicle. In this automatic driving control mode, the electronic control unit can be programmed to vary the attitude of the articulated legs and also, as will be seen below, of the track assemblies that they carry, as a function of the signals emitted by the detection sensors of the terrain contour and according to a series of further operating parameters of the vehicle, including in particular the speed of movement of the vehicle relative to the ground.

The actuating device associated with the first axis 11 controls the angular position of the entire articulated leg 8 with respect to the aforesaid axis 11, and consequently the track width distance of the respective track assembly 9 with respect to the median longitudinal plane of the vehicle. As shown below, when the track width varies between the two front track assemblies or the two rear track assemblies, each track assembly can be rotated about a vertical axis with respect to the corresponding end of the articulated leg, to maintain a parallel attitude to the aforesaid longitudinal median plane. The actuating cylinders 16 instead control the angular position of the leg 8 about the horizontal axis 13 and, consequently, the vertical distance between each track assembly and the module 10 of the vehicle structure to which the respective articulated leg is connected. For example, FIG. 2 shows a vertically extended attitude of the articulated leg 8, in which the vehicle is maintained at a greater height with respect to the track assembly. FIG. 1 instead shows a lowered attitude of the body 2 of the vehicle, in which the legs 8 extend substantially in a horizontal longitudinal direction. In order to avoid interference between the two legs on each side of the vehicle in this condition, the articulated legs 8 arranged on each side of the vehicle are directed in opposite directions, starting from the respective articulation axes 13. More precisely, each front leg 8, in the horizontally extended configuration, is directed forwards from the respective axis 13, while each rear leg 8 is directed backwards, starting from the respective axis 13.

With reference now in particular to FIG. 6, each articulated leg 8 has its end that is distal relative to the structure of the vehicle articulated about a third axis 17 to a coupling member 18, for quick coupling with a respective track assembly 9. The third axis 17 is a horizontal axis parallel to the second axis 13. In the embodiment illustrated here, the articulation of the coupling member 18 to the leg 8 about the third axis 17 is a freely rotatable articulation, which allows the track assembly 9 to have a pitching-free oscillation, about the axis 17, while the vehicle is moving, which allows the track assembly 9 to adapt to the contour of the terrain on which the vehicle proceeds. However, an embodiment in which the axis 17 is a controlled axis is not excluded.

The coupling member 18 is designed to couple with a platform 19 which supports the track assembly 9. To this end, the support platform 19 has a coupling pin 20 projecting upwards and terminating with an end bulb 20a (FIG. 3), of enlarged diameter, arranged to be gripped between a plurality of gripping jaws 21 (FIG. 7) carried by the coupling member 18. The jaws 21 are movable radially on guide tracks 22 carried by the coupling member 18 between a radially outer position, for releasing the coupling pin 20, and a radially inner position for retaining the coupling pin 20. In this coupling position, the pin 20 is, however, free to rotate about its axis with respect to the platform 19. Moreover, in this coupling position, the entire support platform 19 is rotatably supported by the coupling member 18 about a fourth axis 23, vertically directed, by means of a rolling bearing 24. In this way, the entire track assembly 9 carried by the support platform 19 is able to rotate about the fourth axis 23 with respect to the coupling member 18. This rotation is controlled by a motor 24, for example, hydraulic or electric, which controls the rotation of a pinion 25 engaging with a gear 26, carried by the support platform 19, having an inner set of teeth concentric with the axis 23.

Again with reference to FIG. 2, to FIG. 3 and to FIG. 6, the track assembly 9 has a supporting structure that is articulated to the support platform 19 about a fifth axis 27. To this end, in the embodiment illustrated herein, the support platform 19 has two articulation pins 28, aligned with each other, directed longitudinally and projecting anteriorly and posteriorly from the support platform 19, respectively, (FIG. 6 shows the front pin 28). The articulation pins 28 are rotatably received within bushings 29 carried by the supporting structure of the track assembly 9. In this way, the entire structure of the track assembly 9 is free to oscillate about the longitudinal axis 27. Again in the case of the embodiment illustrated herein, the oscillation of the track assembly 9 about the longitudinal axis 27 is opposed by two pairs of shock-absorbing fluid cylinders 30 (only one of which is visible in FIG. 6). Each shock-absorbing cylinder 30 has an end articulated to a side of the support platform 19 and the opposite end articulated to the supporting structure of the track assembly 9.

With reference now, in particular, to FIGS. 4 and 8, the supporting structure of the track assembly 9, indicated—in its entirety—by the reference number 31, comprises an upper wall 32, carrying the bushing 29 for the articulated connection about the longitudinal axis 27, and two side walls 33 parallel to each other and spaced apart. At the front end of the track assembly 9, the two side walls 33 are rigidly connected to each other by means of a stationary tubular shaft 34.

The shaft 34 extends axially through an electric motor 35 for driving the track assembly. The electric motor 35 has an inner stator 36, rigidly connected to the shaft 34, and an outer rotor 37, surrounding the stator 36. Two rotating wheels 38 for driving the track, rotatably connected above the portions of the shaft 34 that protrude from opposite sides of the electric motor 35, are rotatably connected with the rotor 37 of the electric motor 35.

The track assembly 9 comprises a closed-loop track 39 of elastomeric material, engaged both above the front driving wheels 38, and above two rear wheels 40 freely rotatably mounted on the side walls 33 of the supporting structure of the track assembly 9, at the rear end of the track assembly 9, and about two sets of wheels 41, 42, freely rotatably mounted on both sides of the track assembly. More precisely, each side wall 33 of the supporting structure of the track assembly 9 carries a first upper set of wheels 41, freely rotatably mounted on the respective wall 33, as well as a second lower set of wheels 42, which are each rotatably mounted on a wheel support 43 connected to the respective side wall 33 of the supporting structure of the track assembly 9 by means of a suspension system, including, in the illustrated example, a shock-absorbing cylinder 44. In this way, each of the wheels 32 of the lower set of wheels of the track assembly is free to oscillate vertically, following the unevenness of the ground.

All the wheels 38, 40, 41, 42 of the track assembly have their axes parallel to each other and orthogonal to the longitudinal direction of the track assembly. The drive wheels 38, and possibly also the rear wheels 40, or the two sets of side wheels 41, 42 can have any known configuration to ensure their correct engagement with the inner surface of the track 39. For example, the track 39 can have a profiled inner surface for engaging a set of teeth of the driving wheels 38.

Referring now to FIGS. 15, 16, the articulated connection about the longitudinal axis 5 between the front module 3 and the rear module 4 of the vehicle is obtained by means of a rolling bearing (not shown in the drawings) interposed between a tubular opening 45 protruding from the rear wall of the front module 3 and a corresponding tubular opening (not shown) protruding from the front wall of the rear module 4. In the connected condition, the two tubular openings, rotatably mounted with respect to each other, constitute a communication corridor between the inner spaces of the front and rear modules 3, 4. FIG. 16 shows an example of the arrangement of the space inside the front module 3. It is evident that these modules can be arranged to accommodate personnel and equipment or to act as a hold, according to the needs of each specific application.

FIG. 17 shows the two tubular openings 45, 46, as well as the internal combustion engine 47 which is associated with the rear module 4.

In the embodiment that is illustrated here, the internal combustion engine of which the vehicle is provided is designed solely to drive, by means of a transmission belt 48, the shaft of a battery of electric generators 49 that supplies the entire vehicle with electrical power. The internal combustion engine 7 can have any known configuration, optimized to reduce consumption and harmful exhaust emissions.

When driving the vehicle, the driving action is entrusted solely to the electric motors 35 associated with the track assemblies 9. These motors are driven by the battery of generators 49, which are connected to the generators by means of cables passing through an inner passage formed in each articulated leg 8, and in the structure of the respective track assembly 9. The vehicle is equipped with one or more electronic control units that manage the power supply of the advancement electric motors 35, as well as the actuation of all the actuators described above associated with each articulated leg and the respective track assembly.

During advancement on the ground, the articulated legs rotate about the respective articulation axes 11, 13 to modify the height of the vehicle structure with respect to each track assembly and to change the track width distance between each pair of track assemblies, depending on the characteristics of the terrain. Furthermore, during the advancement on the ground, each track assembly oscillates about the transverse axis 17 and about the longitudinal axis 27 to adapt to the terrain configuration. As the track varies, each track assembly 9 is controlled in the position about the vertical axis 23 to keep it oriented in the direction of travel.

According to a further preferred characteristic, two robotized manipulator arms 50 are provided on the two sides of the front module 3 of the vehicle (see FIGS. 1, 18, 19). Each robotized manipulator arm 50 comprises a fixed structure 51, rigidly connected to the vehicle structure, a base member 52 rotatably mounted about a transverse axis 53 on the fixed structure 51, a first arm element 54 rotatably mounted on the base member 52 about an axis 54 orthogonal to the axis 53, and a second arm element 55 articulated to the first arm element 54 about an axis 56 parallel to the axis 54. The second arm element 55 carries a telescopic stem 56 terminating with a maneuvering tool 57, which in the illustrated example comprises two gripping jaws 58 operated by means of a gear transmission by one or more electric actuators. More generally, the manipulator arms can carry, in a replaceable manner, any type of maneuvering tools, or for example, support members for snow turbines, snowploughs, excavation blades or shovels and the like.

The axial sliding movement of the telescopic stem 56 and the rotation movements about the axes 53, 54, 56 are associated with respective electric actuators (not illustrated) in a manner completely analogous to the art in the field of manipulator robots.

FIG. 18 shows the robotized arm 50 in a partially extended condition, while

Figure 1:
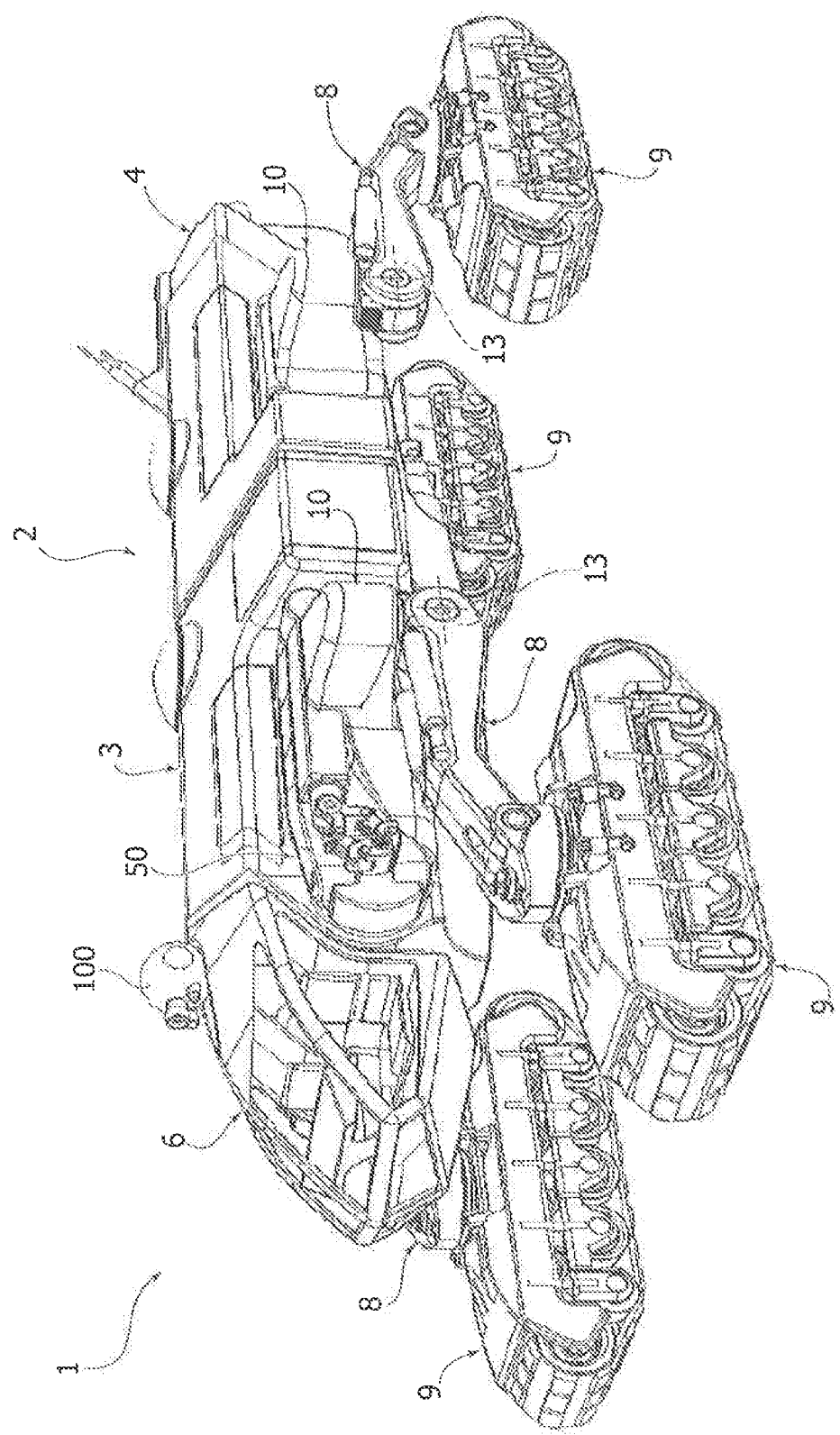
Figure 2:
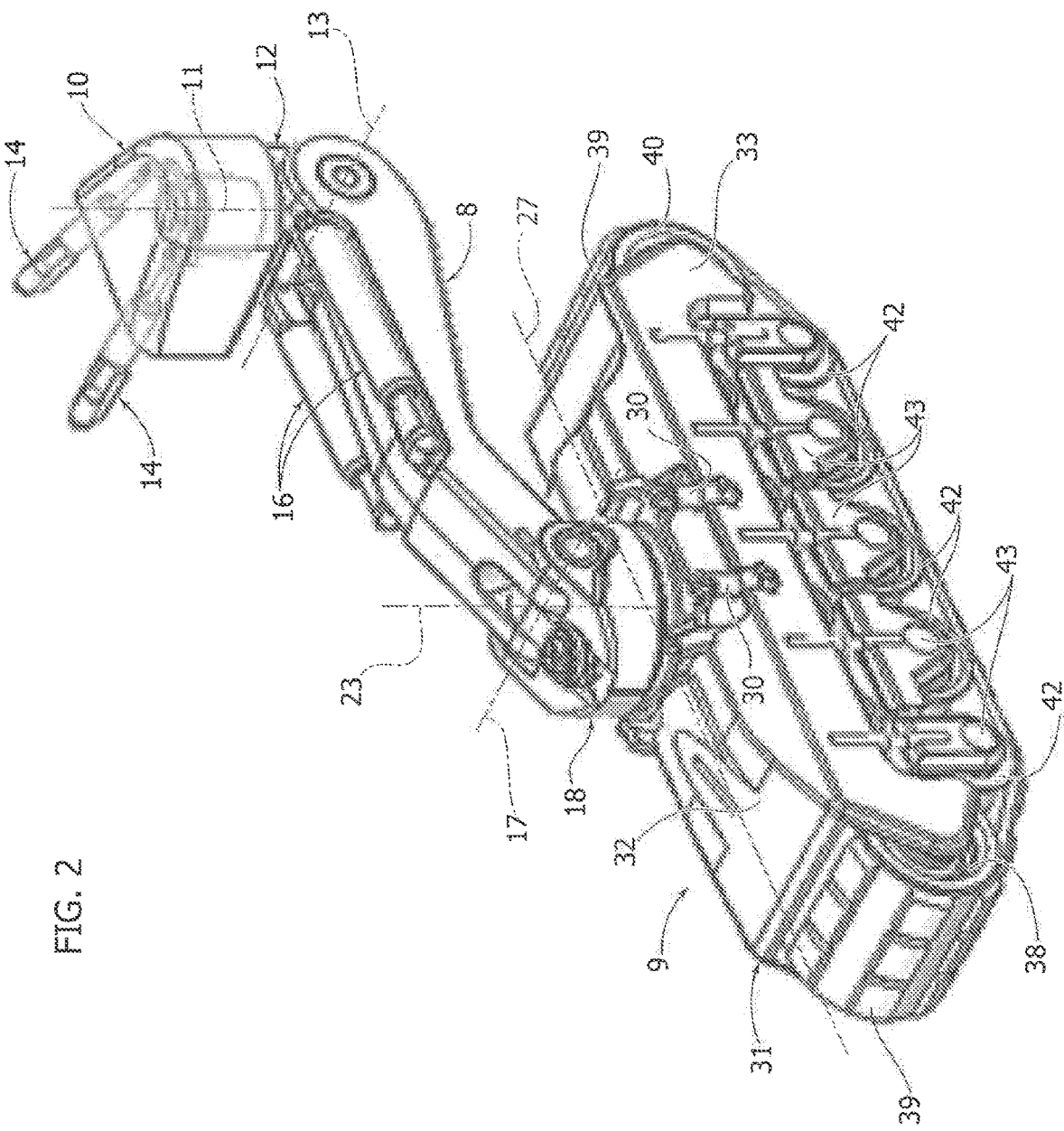
Figure 3:
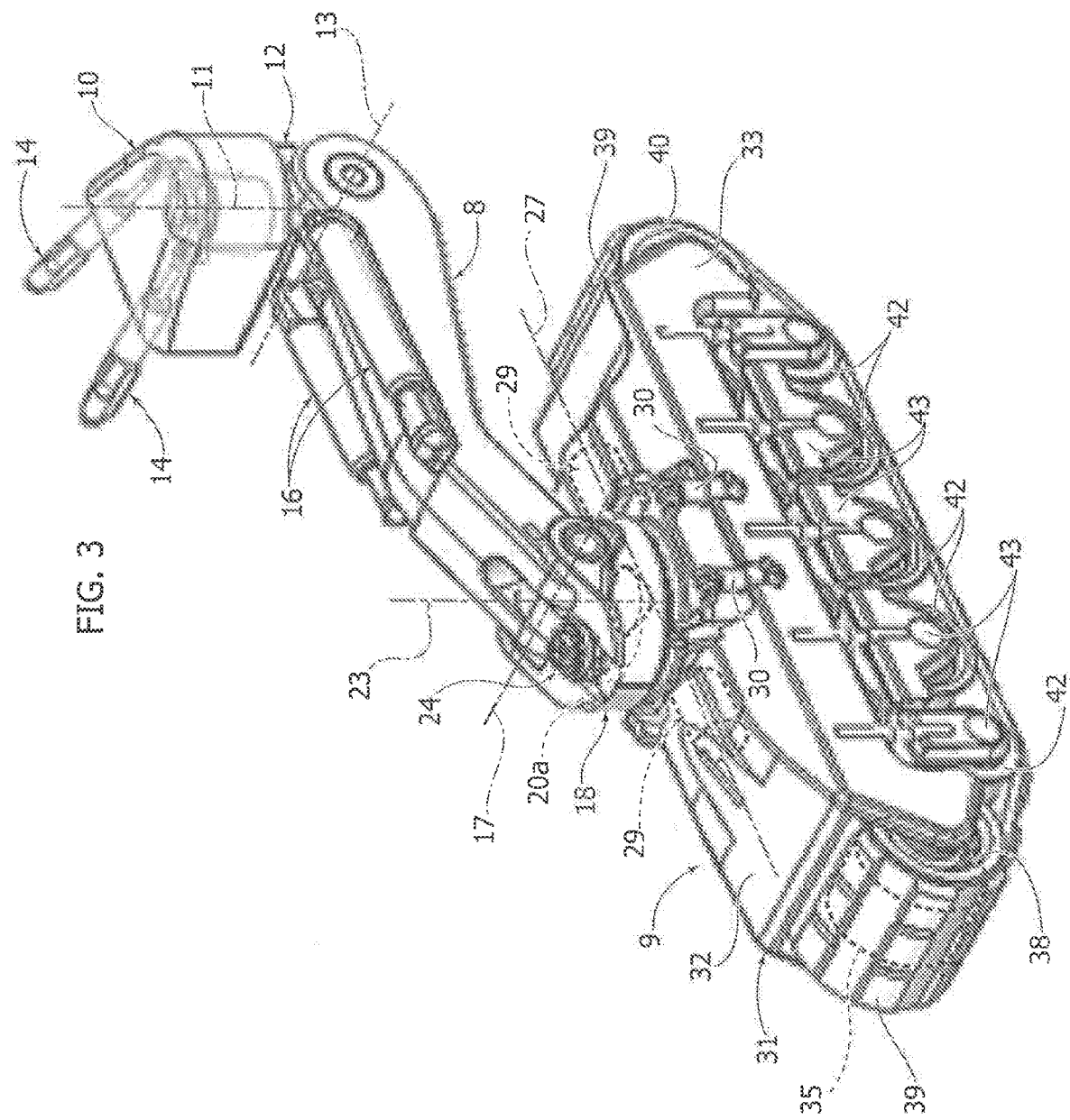
Figure 4:
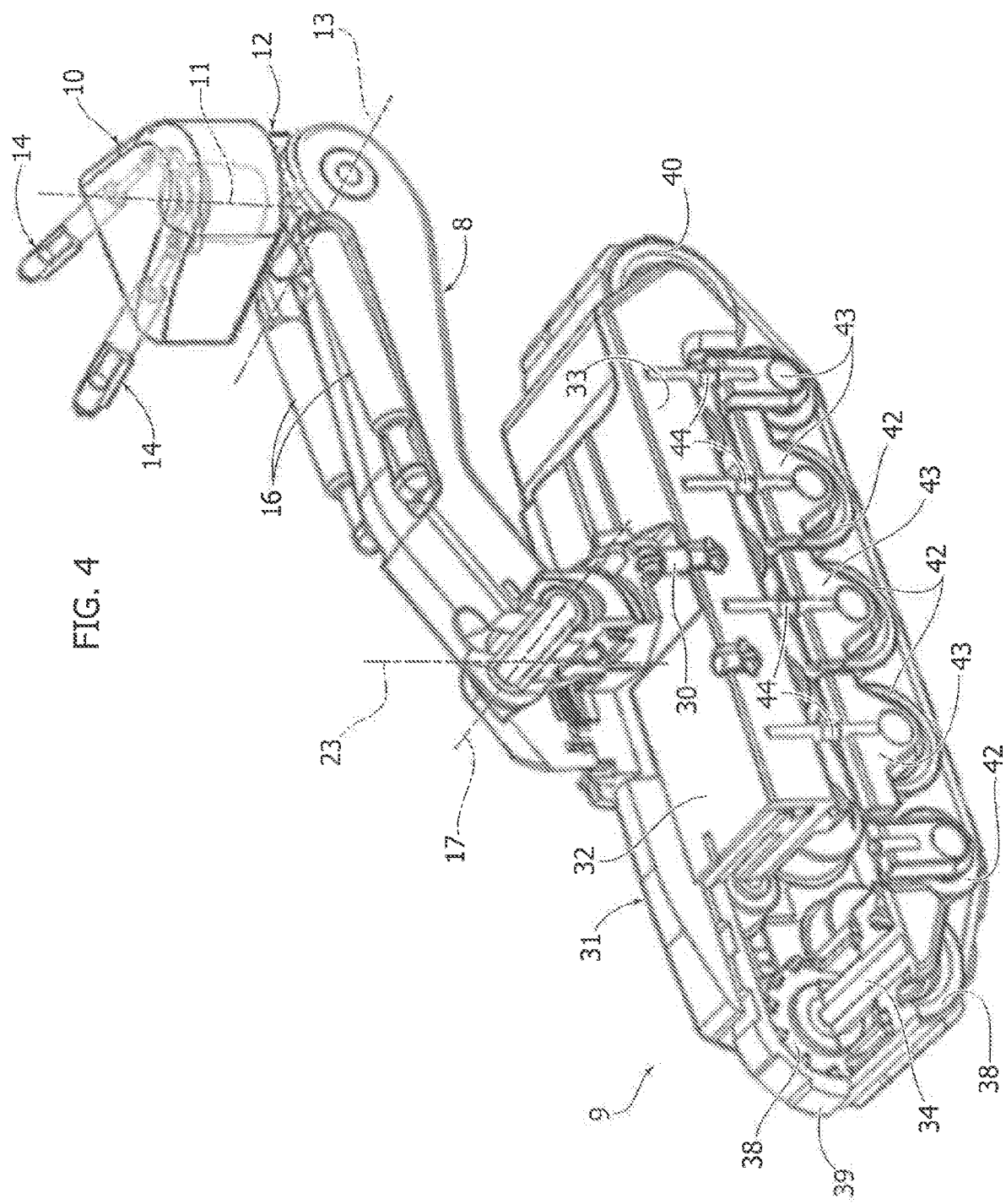
Figure 5:
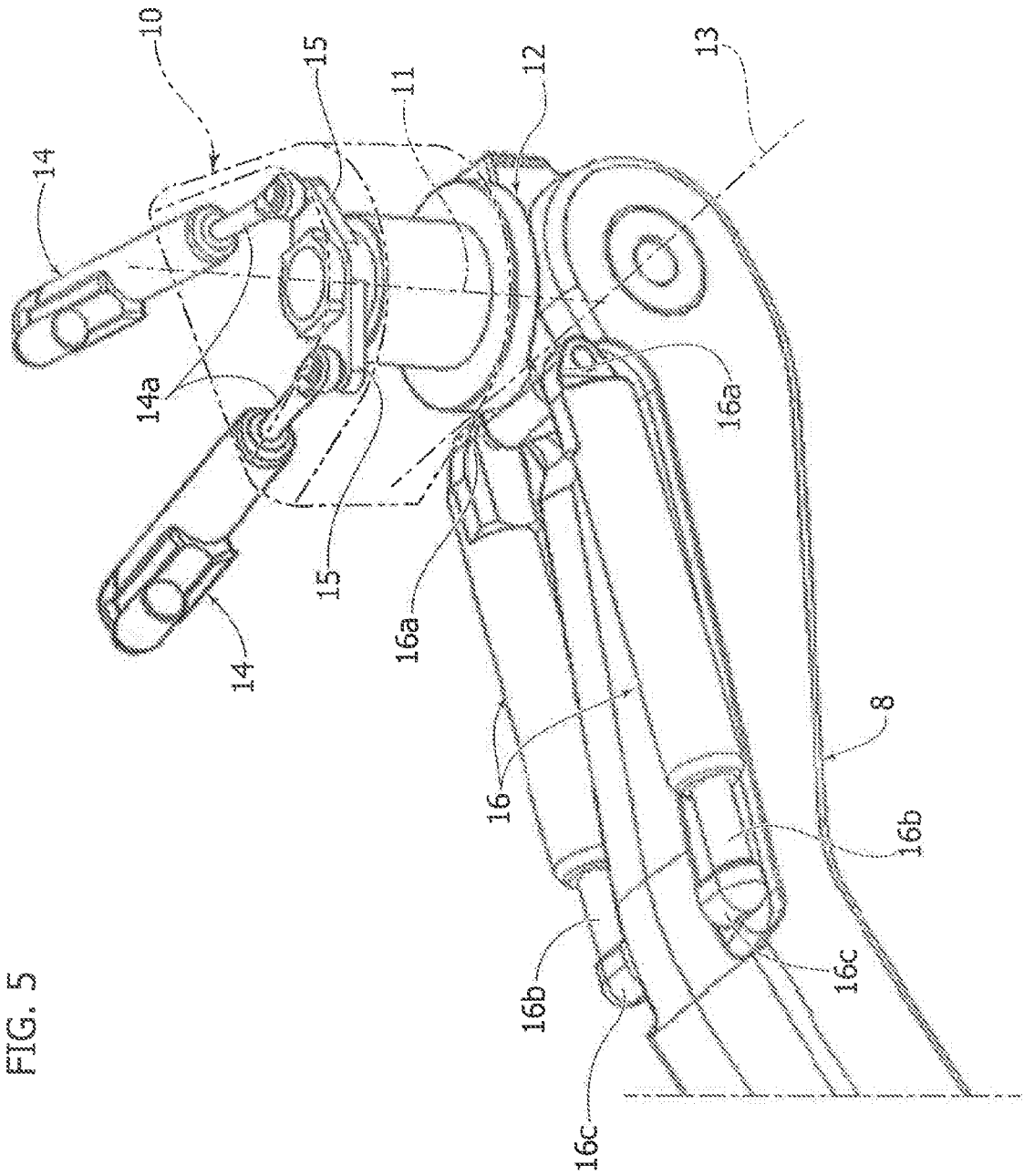
Figure 6:
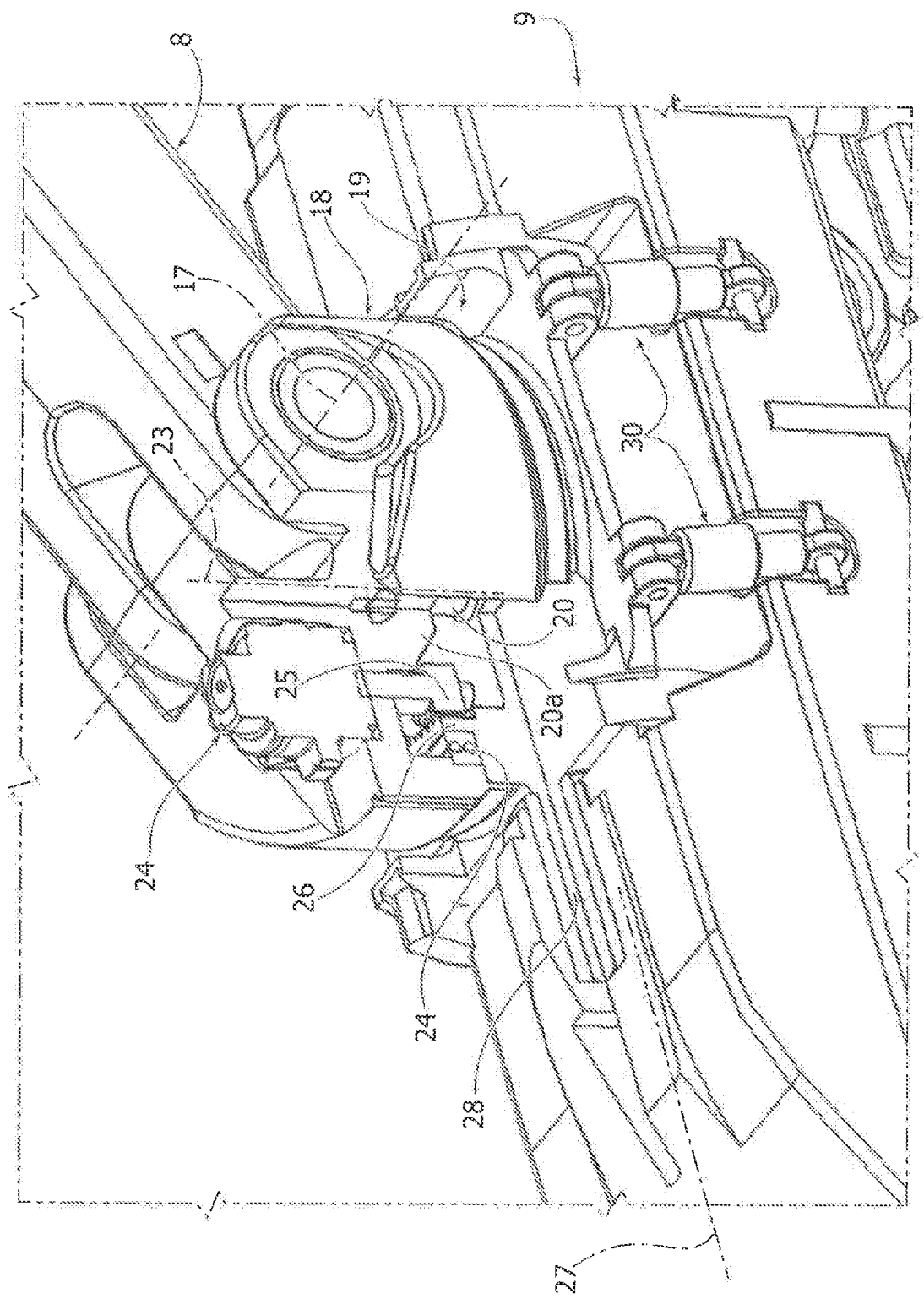
Figure 7:
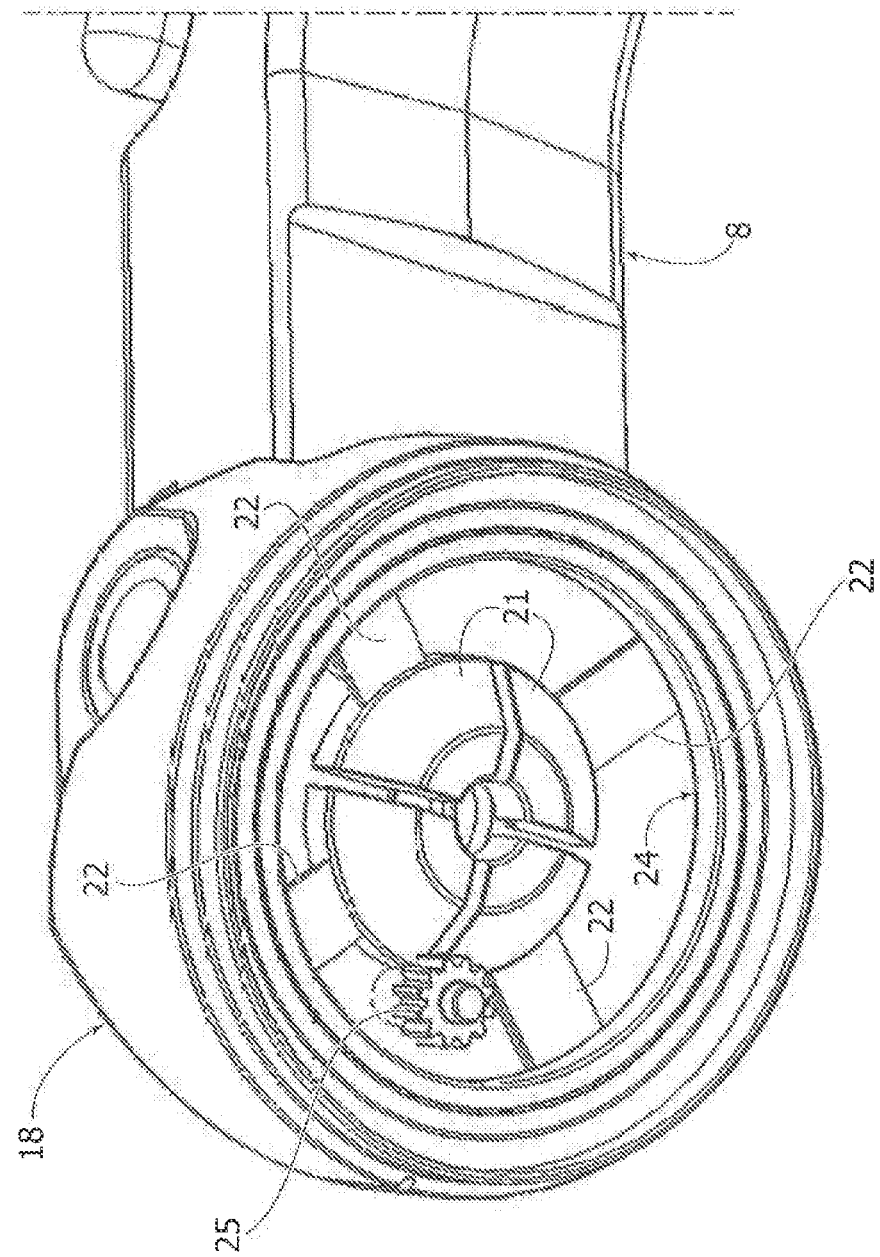
Figure 8:
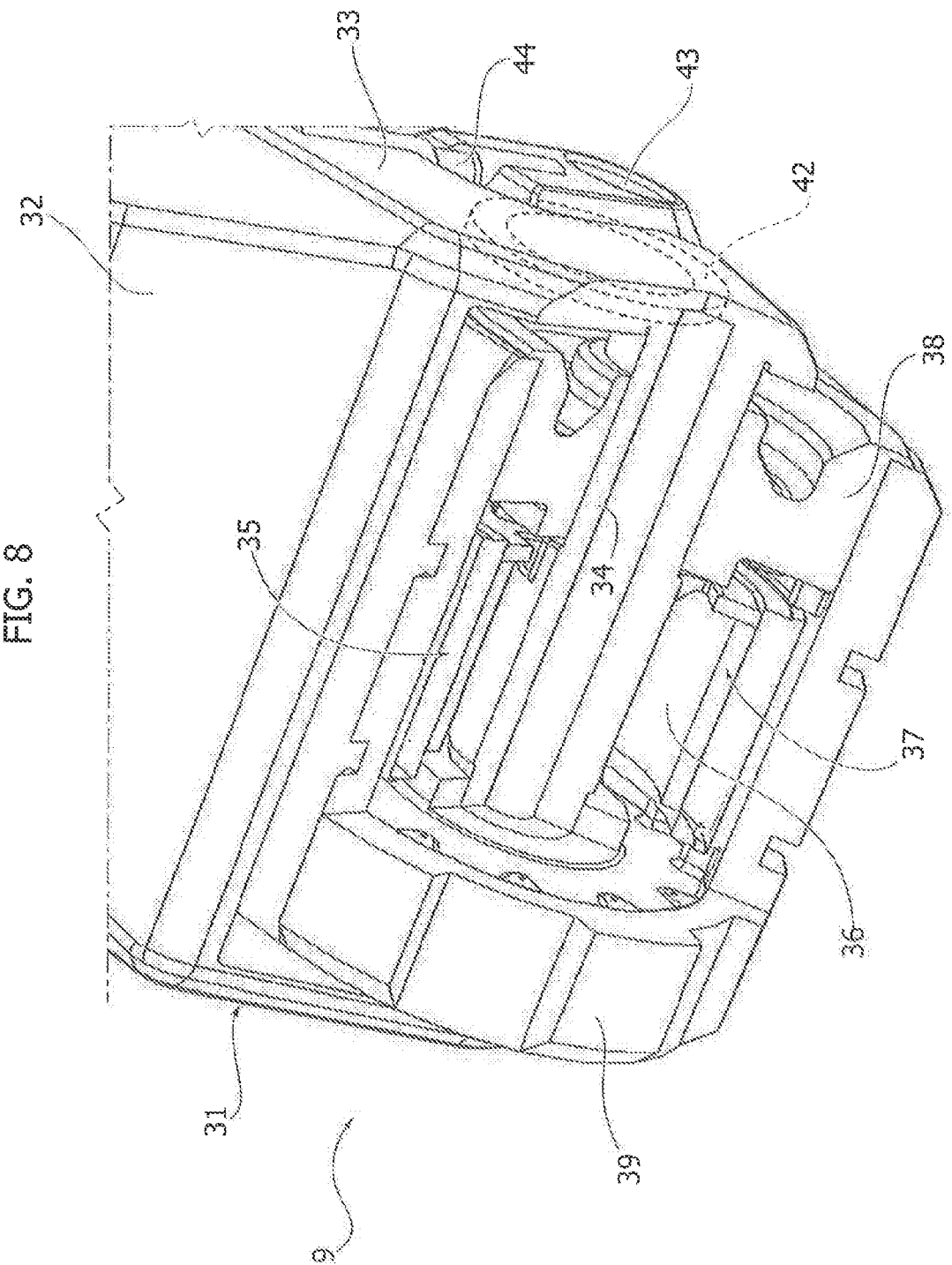
Figure 9:
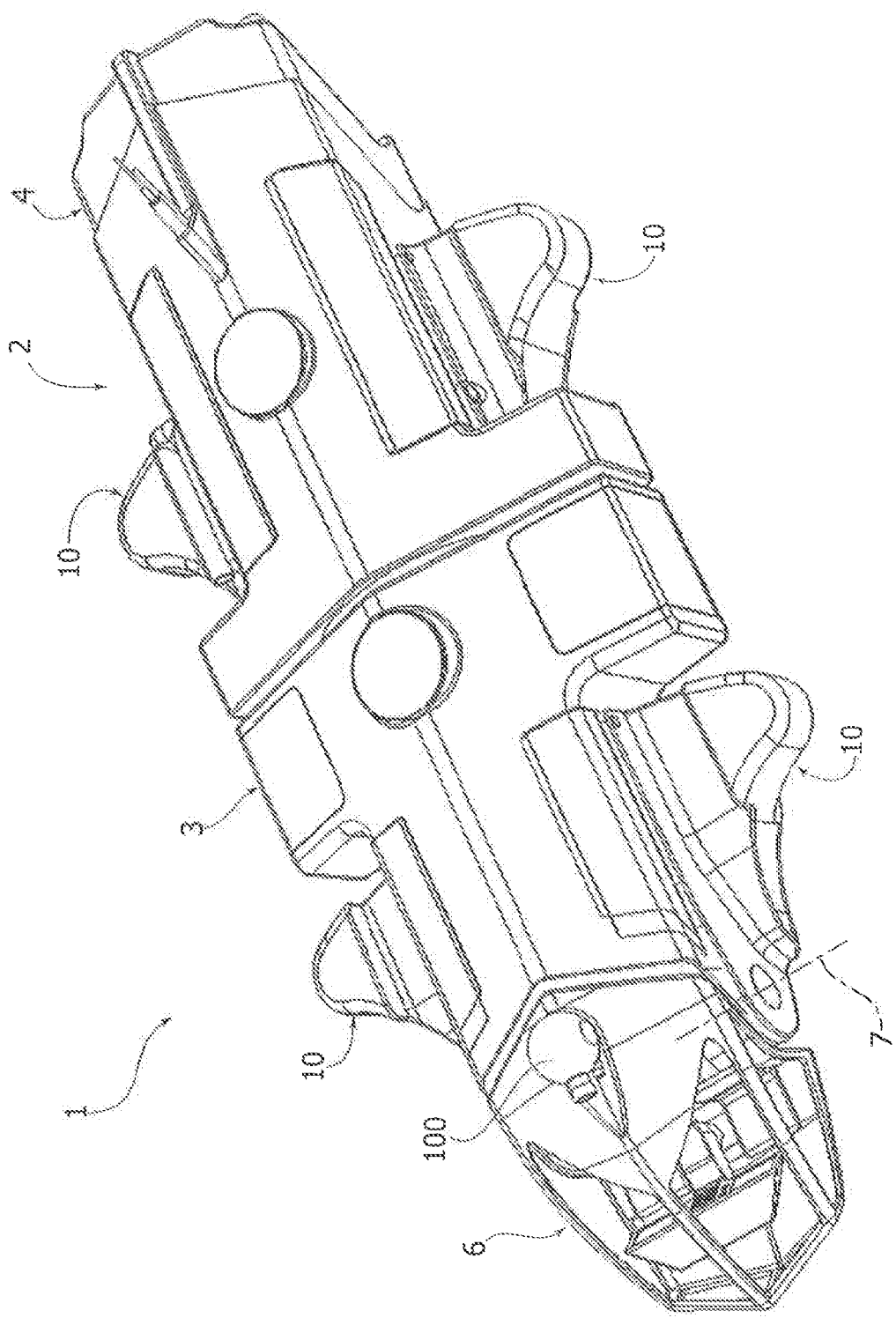
Figure 10:
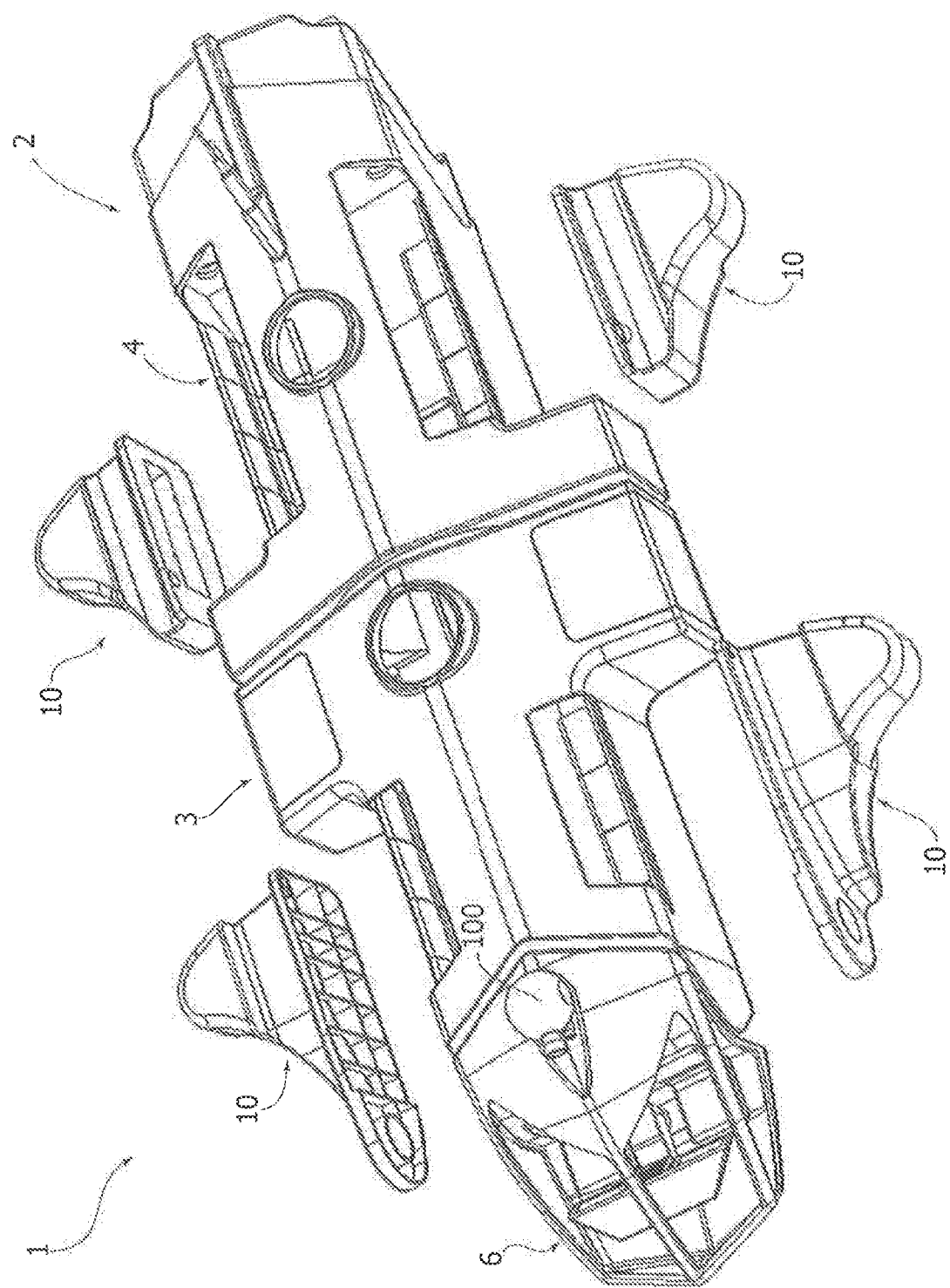
Figure 11:
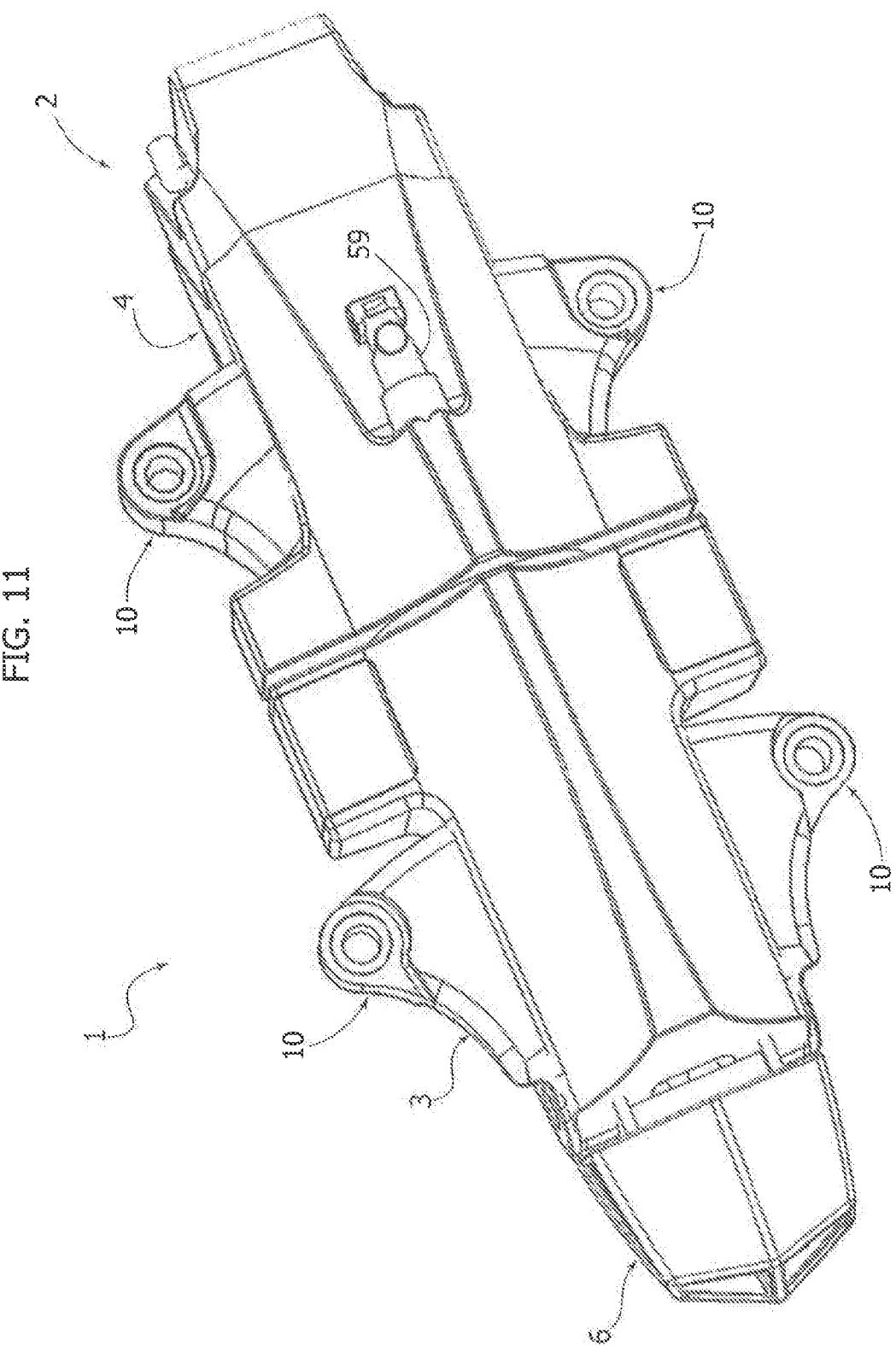
Figure 12:
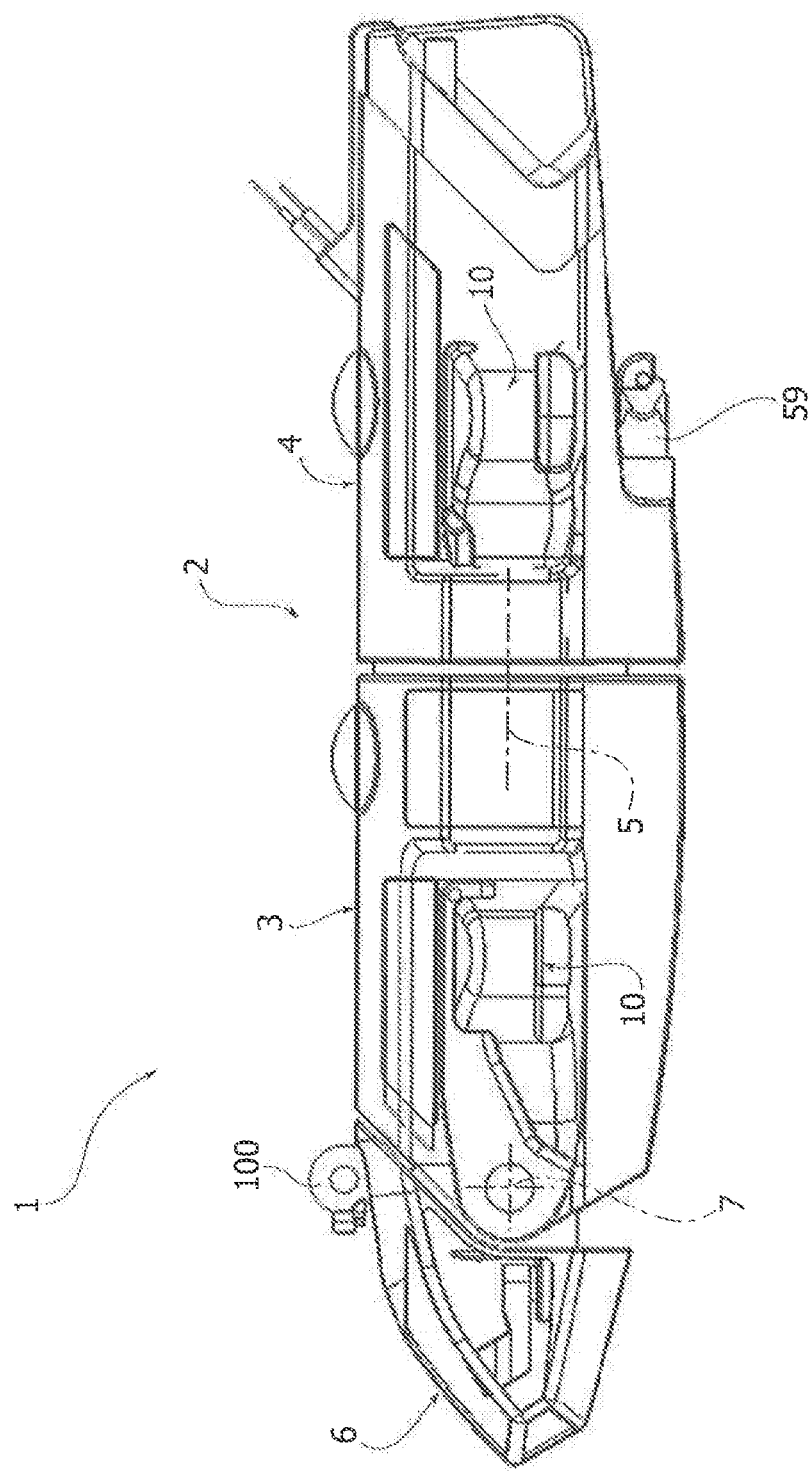
Figure 13:
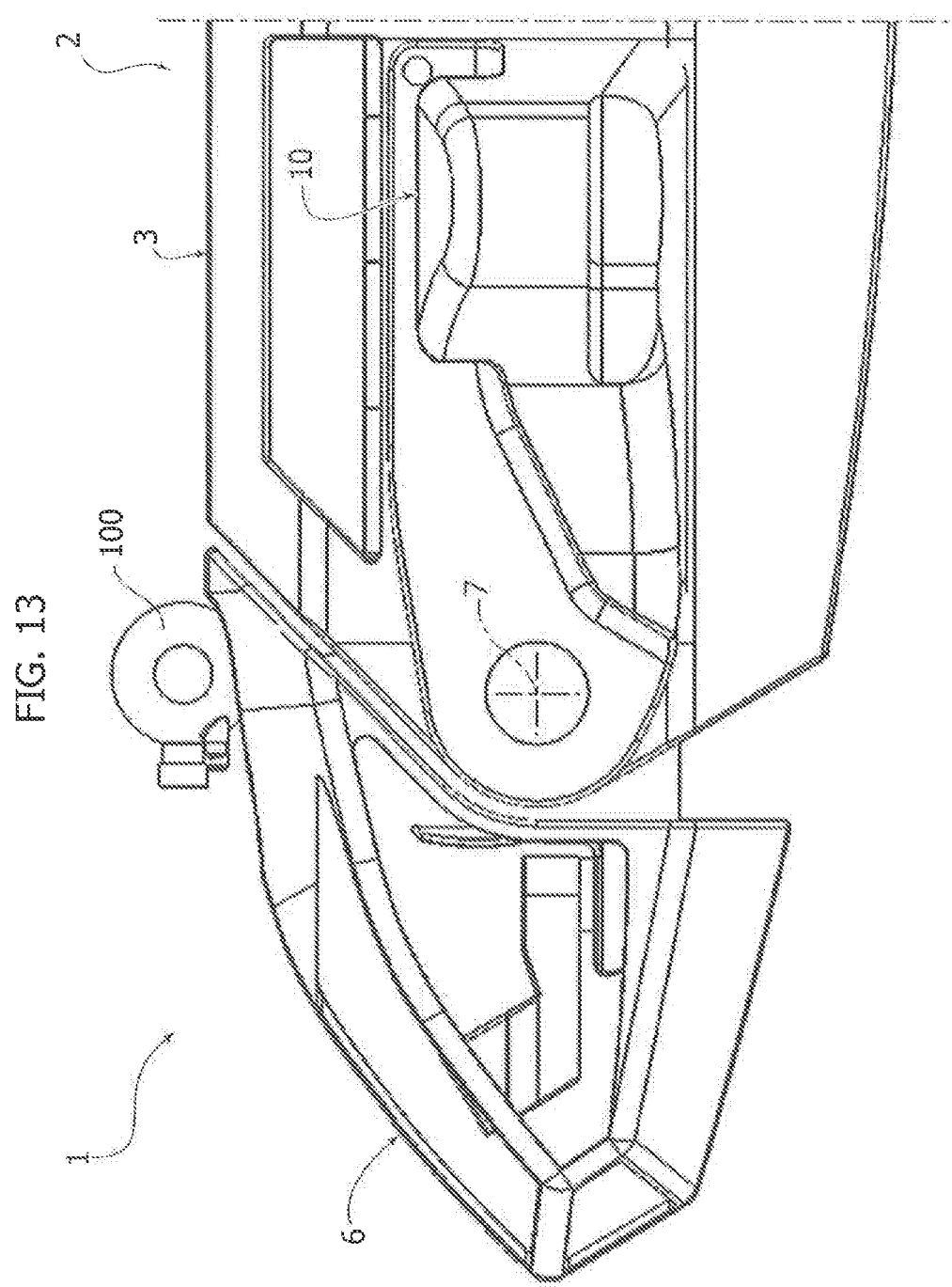
Figure 14:
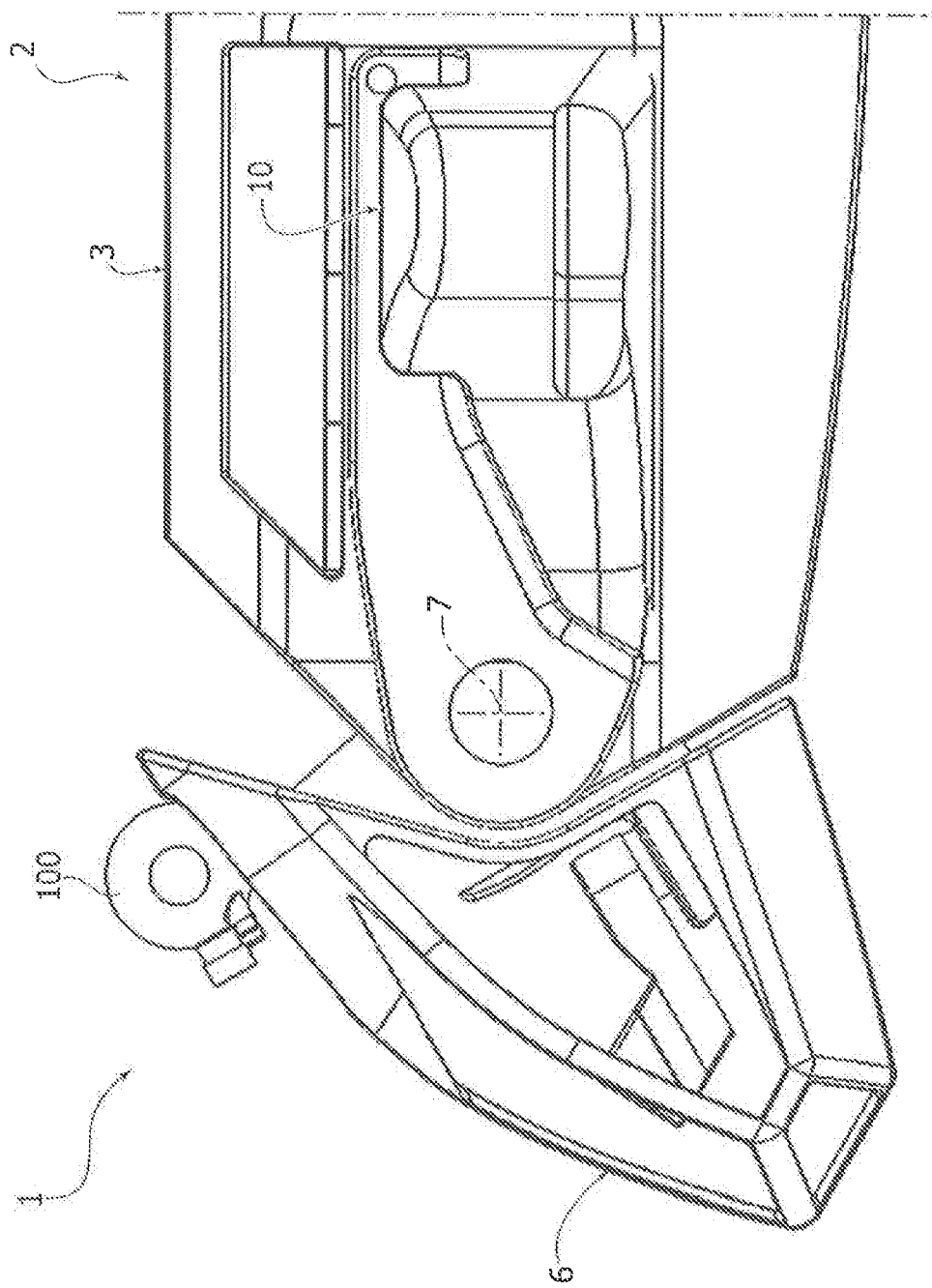
Figure 15:
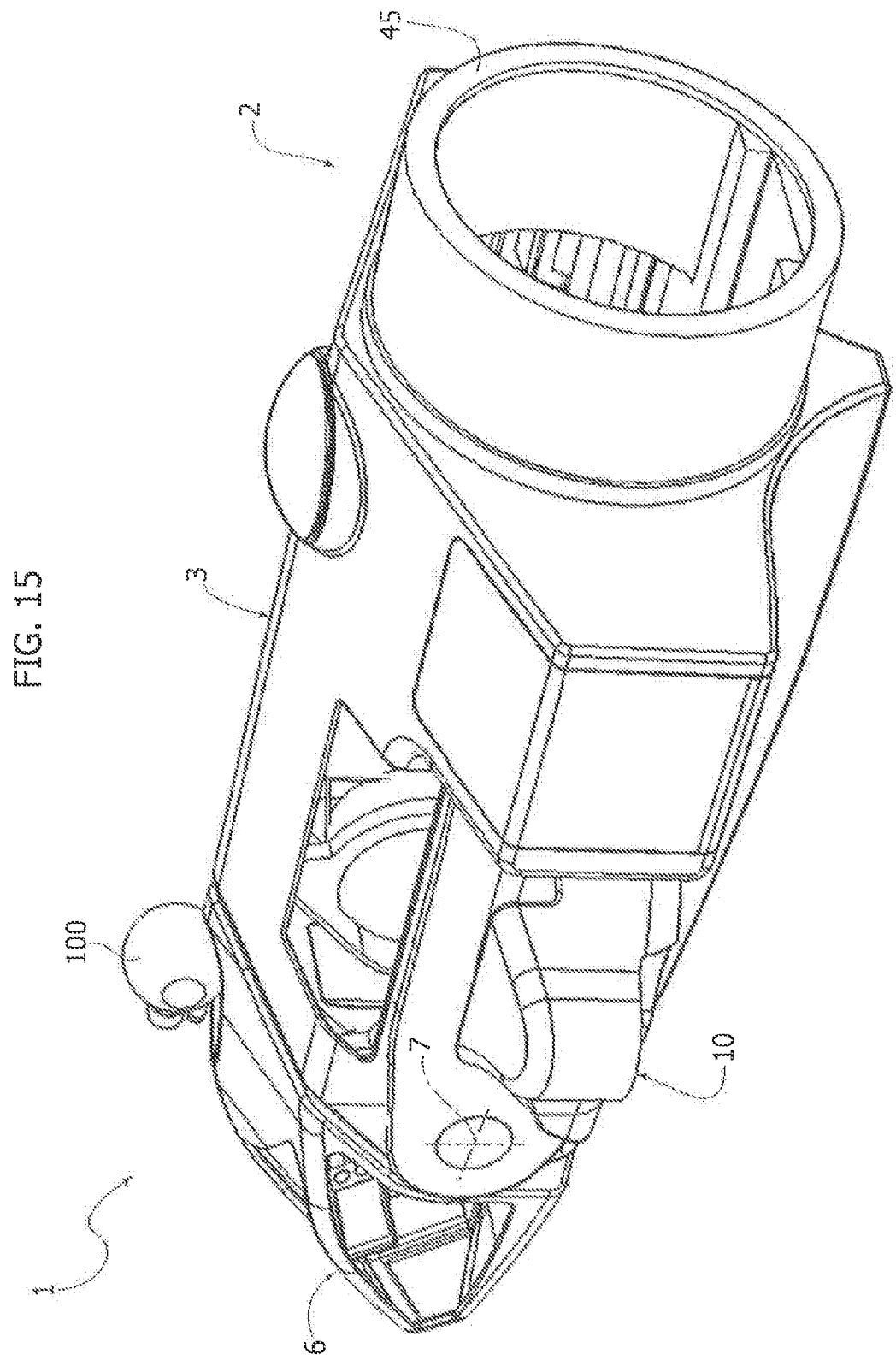
Figure 16:
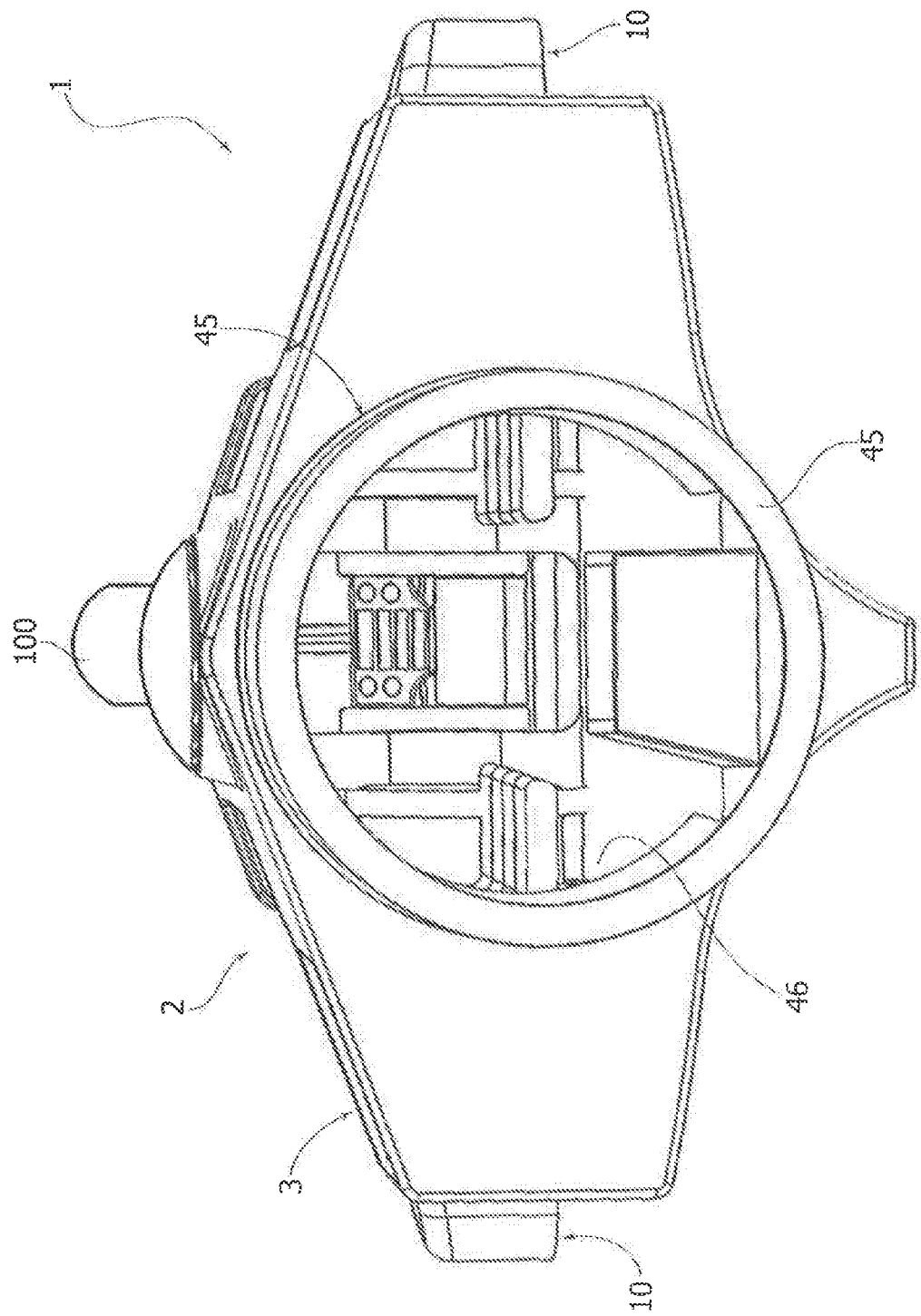
Figure 17:
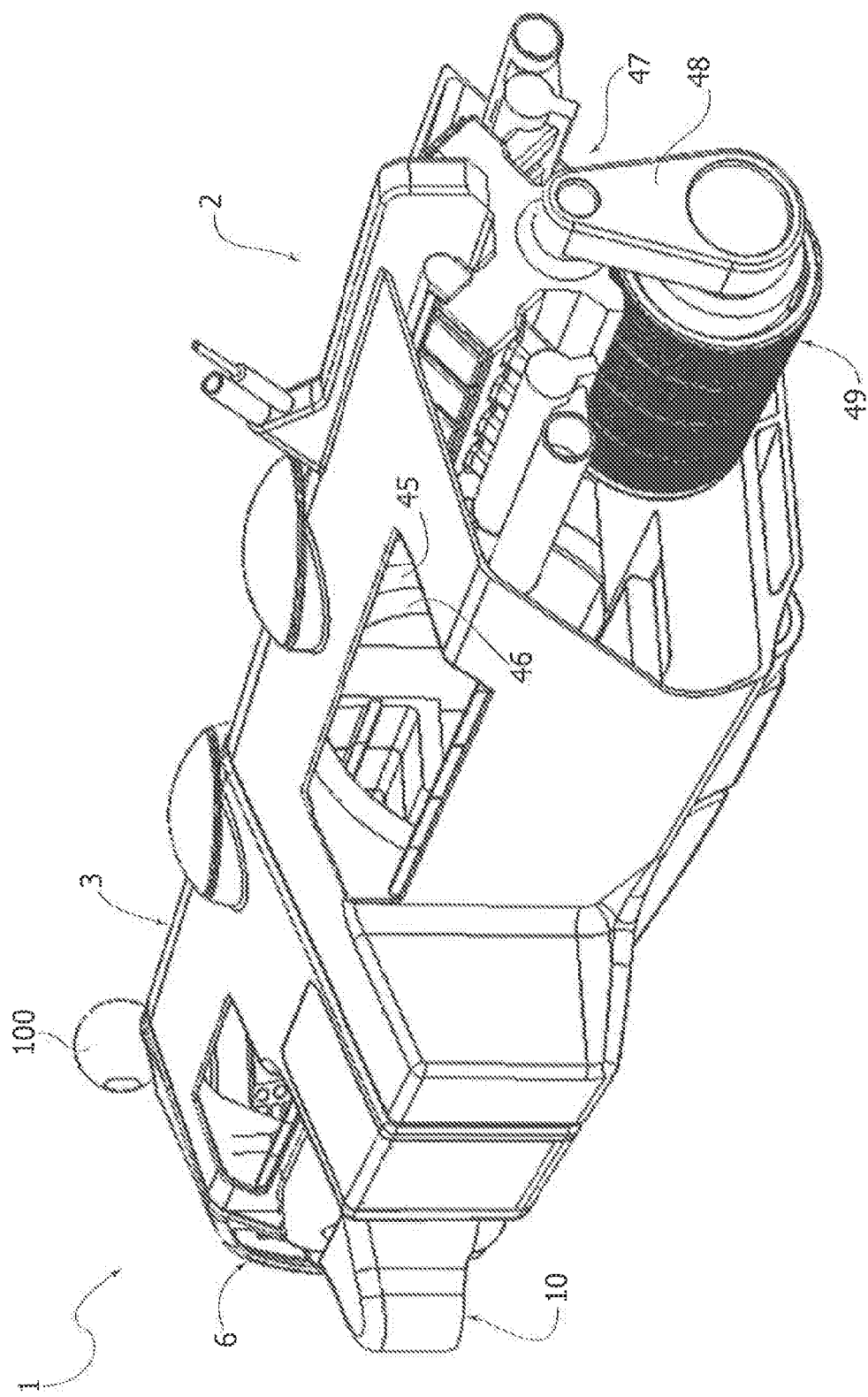
Figure 18:
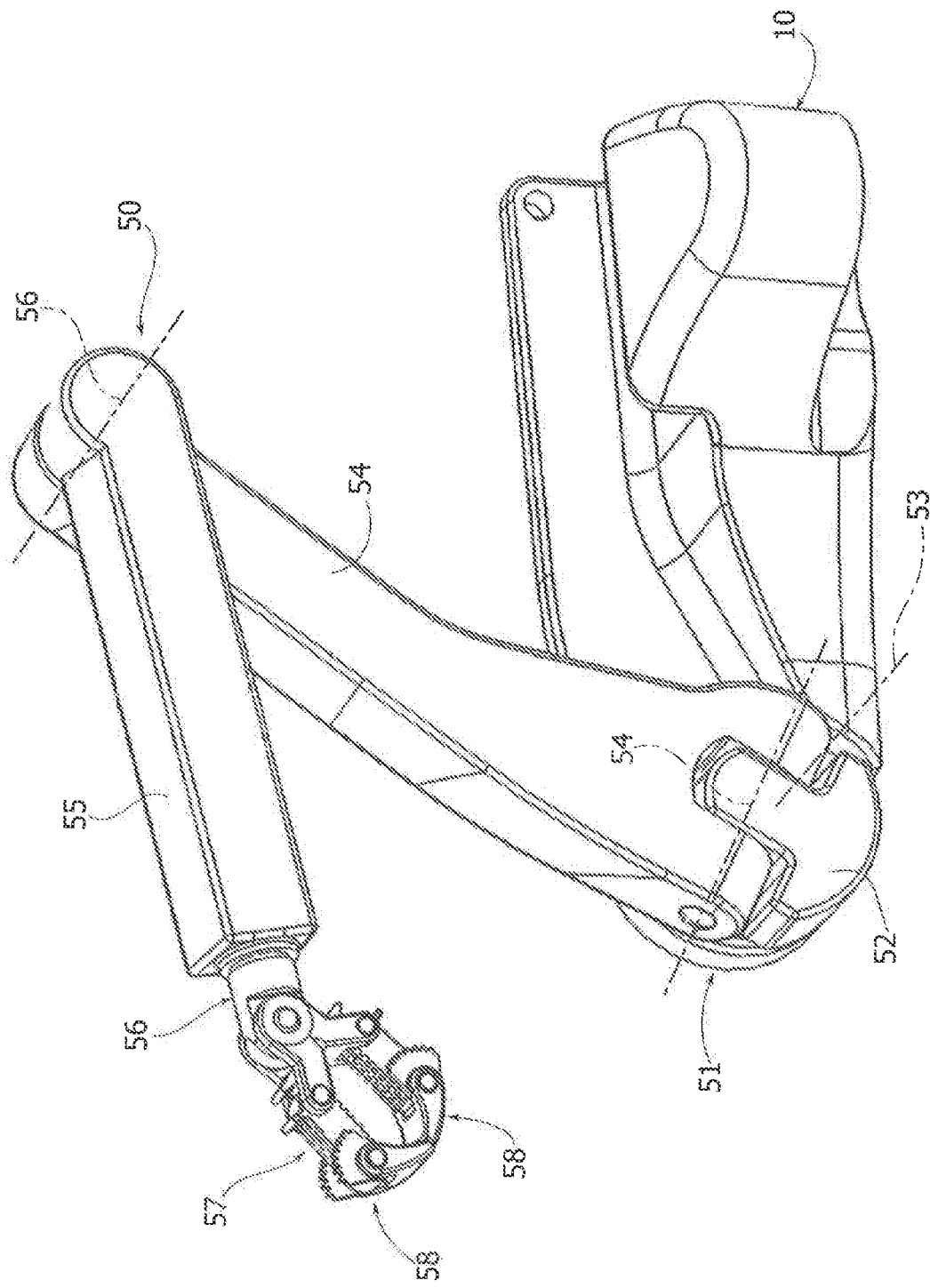
Figure 19:
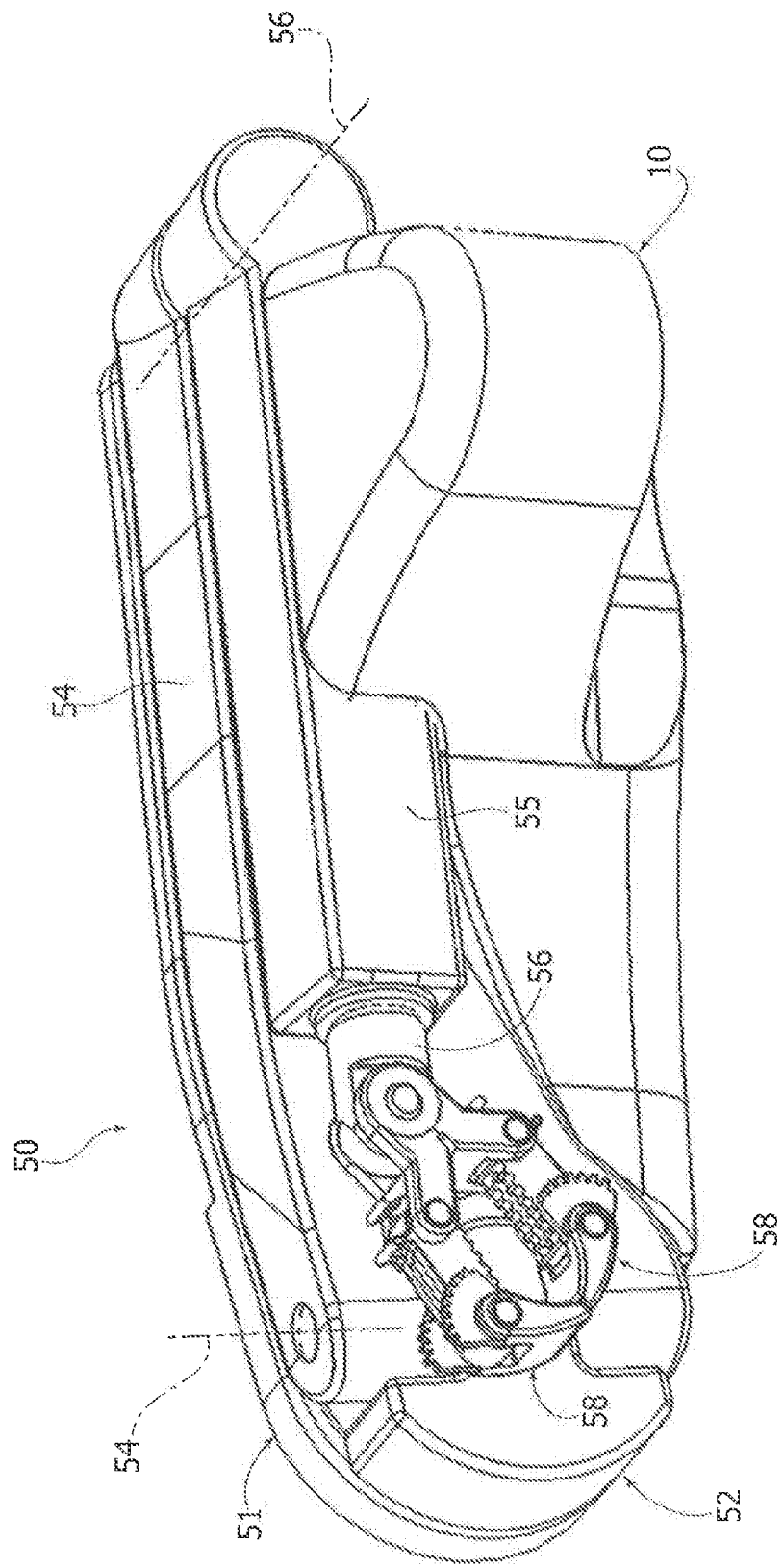
FIG. 19 shows the arm 50 in the folded rest condition.
Figure 20:
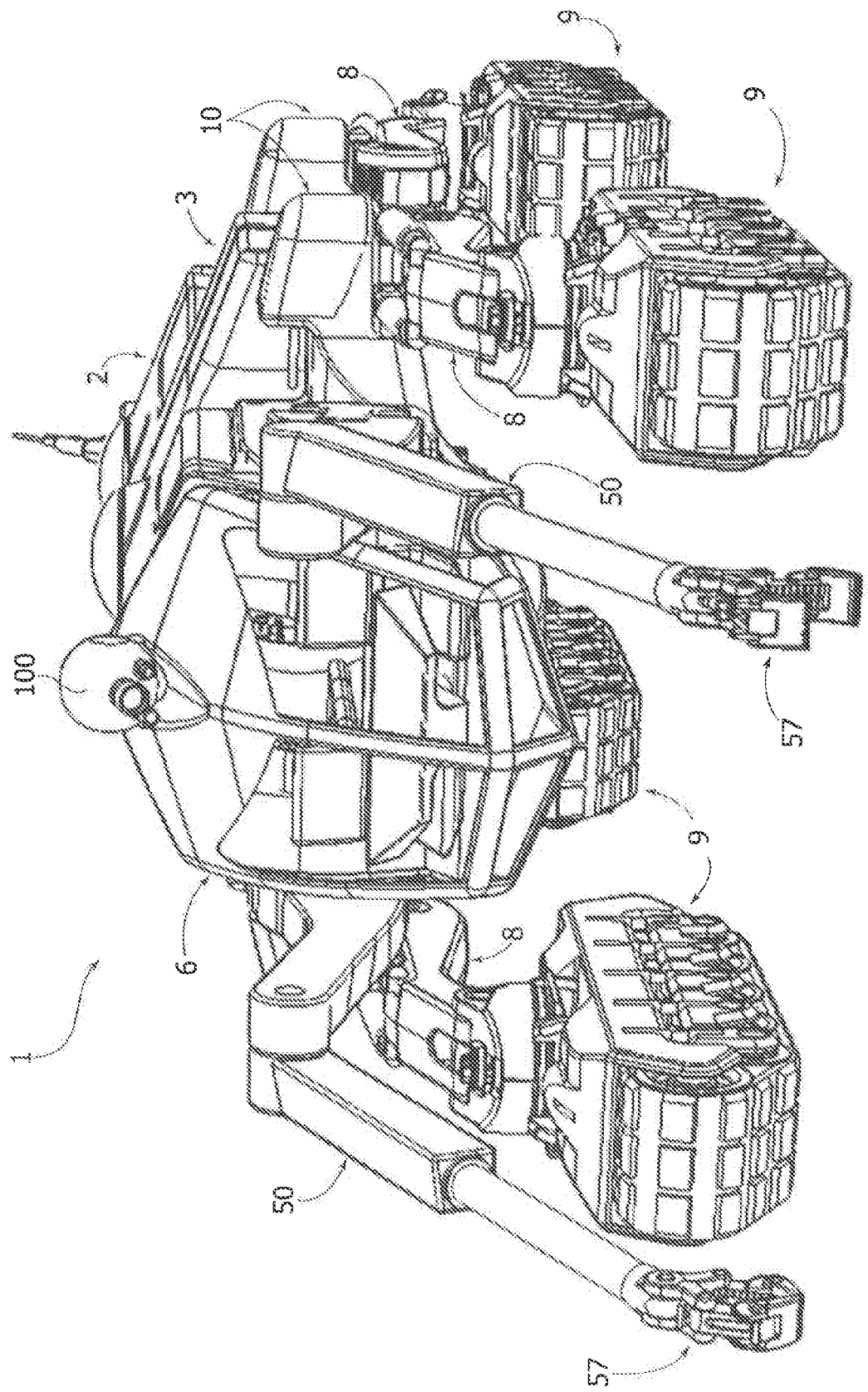
FIG. 20 shows a variant of the vehicle of FIG. 1, with manipulator arms in a relaxed condition.

As is evident from the preceding description, the vehicle according to the invention can be configured to be used only on land, without prejudice to the possibility of crossing water courses with the track assemblies 9 advancing on the bottom of the water course, while the body of the vehicle is kept above the water surface, thanks to an extended configuration of the articulated legs 8. The vehicle is designed to be produced in particular with large dimensions, with articulated legs that—in the extended condition—reach a length in the order of 2-3 m.

However, in the preferred embodiment, the vehicle according to the invention is arranged for being used as an amphibious vehicle or even as an underwater vehicle. In the preferred embodiment, the body of the front and rear modules 3, 4 constitutes a hull configured to float or move underwater and a nozzle 59 is provided below the rear module 4 for emitting a water jet.

Figure 21:
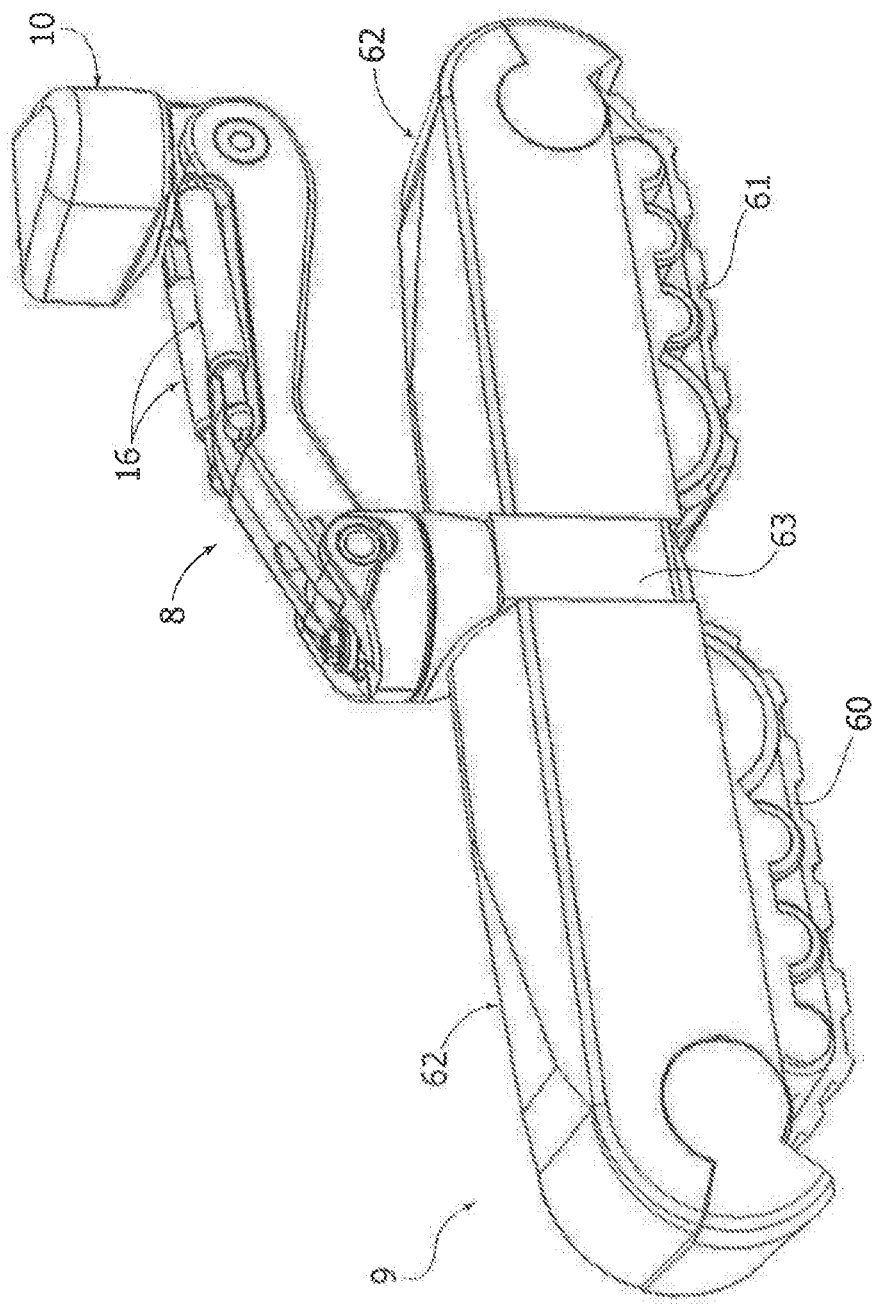
Figure 22:
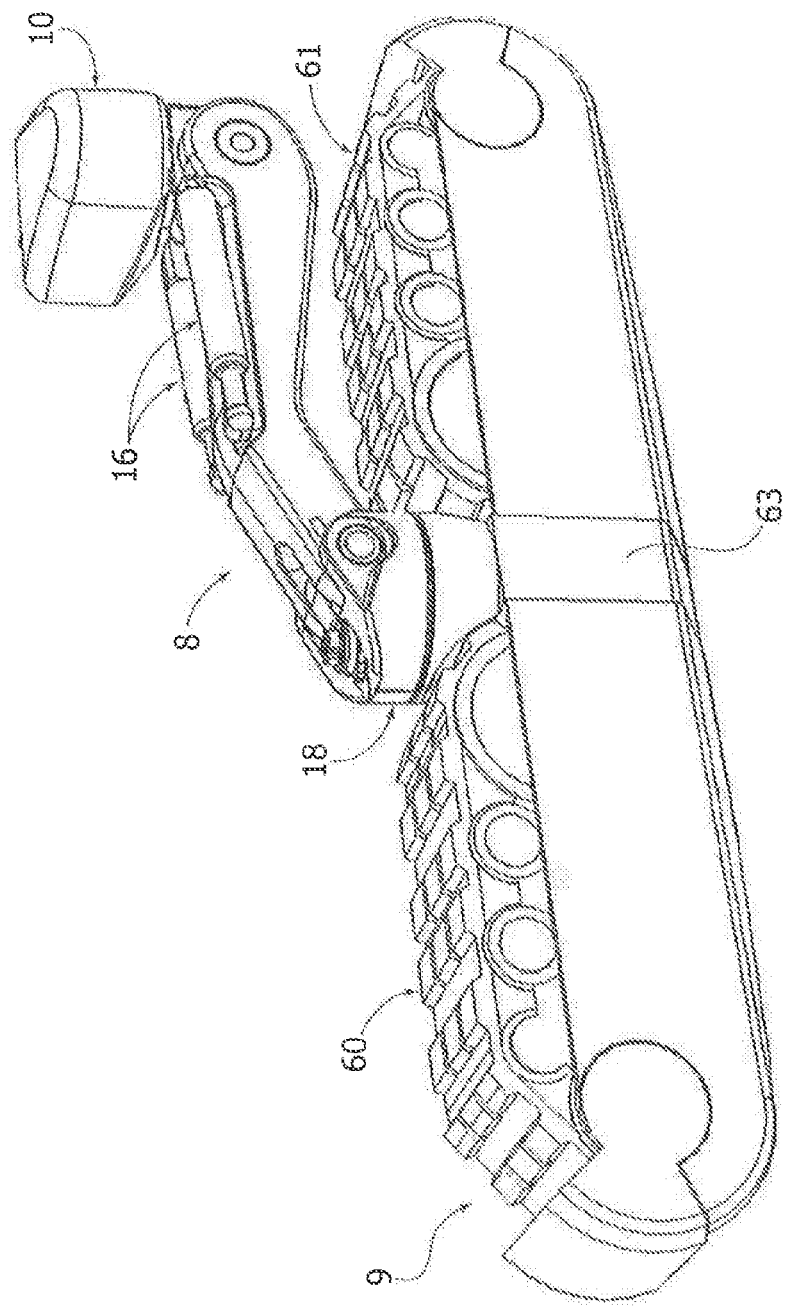

FIGS. 21, 22 illustrate a variant of the track assembly 9, in which the assembly 9 includes two track sections 60, 61, with which two hulls 62 are associated, rotatably supported about a longitudinal axis by a central section 63 of the track assembly connected to the coupling member 18, and controlled in position by an electric drive motor (not illustrated). In the advancing configuration on the ground (FIG. 21), two hulls 62 are arranged above the two track sections 60, 61, and serve as covers. However, the hulls 62 can be rotated by 180° until they reach the position shown in FIG. 22, in which they form a floating body that allows the vehicle to move rapidly over the water, as a hydrofoil.

Figure 23:
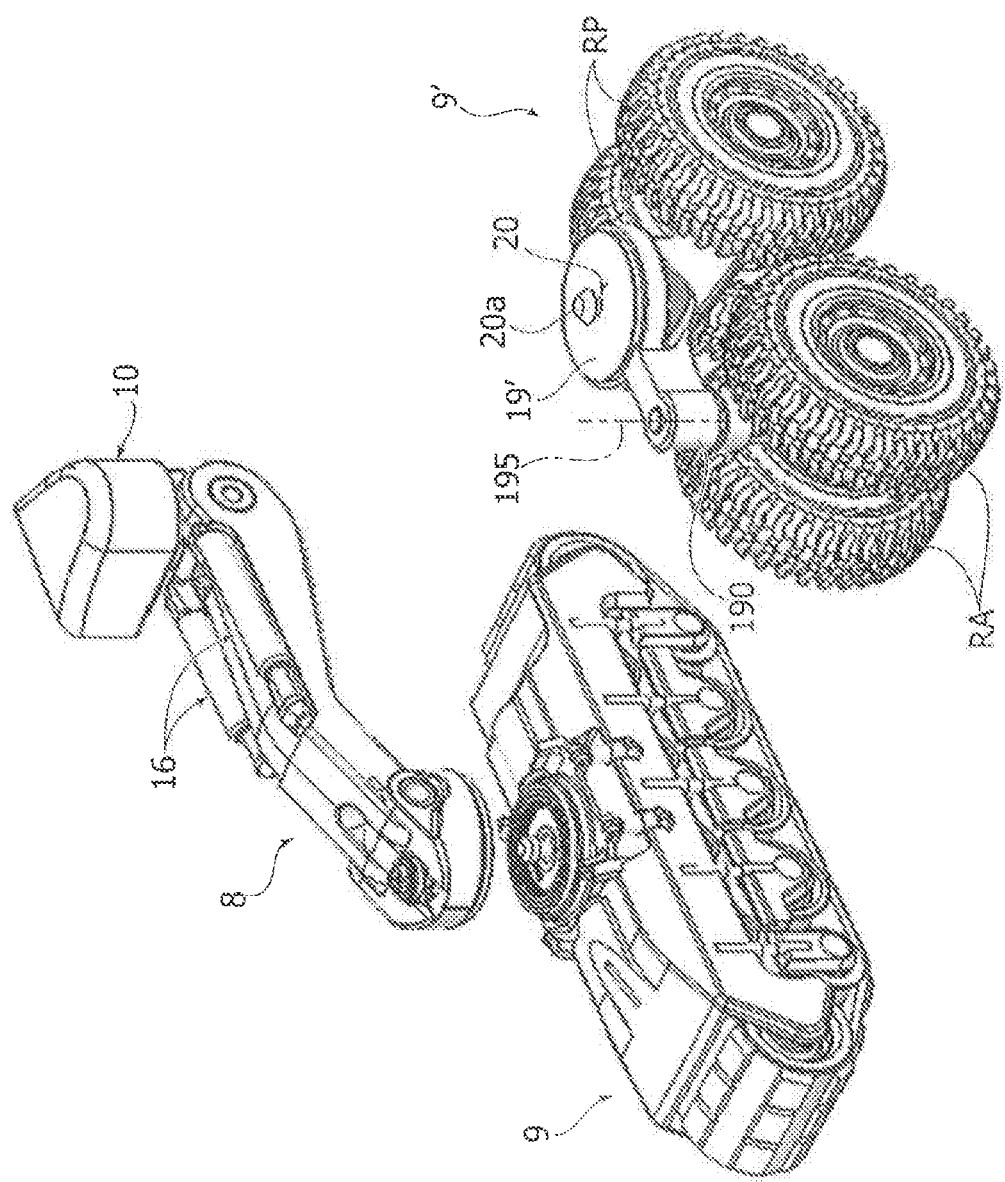

For the mass on the ground, the vehicle can be configured with wheels, decoupling each track assembly 9 from the respective articulated leg and replacing it with an assembly of similar configuration, but provided with wheels instead of tracks, at least one of said wheels being motorized. FIG. 23 shows the replacement of a track assembly 9 with a wheel assembly 9', which has a platform 19' also provided with a coupling pin 20', provided with a widened head 20a', for quick coupling with the jaws 21 of the quick coupling device of which the leg 8 is equipped. The platform 19' carries a supporting structure of twin front wheels RA and twin rear wheels RP. In one embodiment, the structure supporting the front wheels RA is rotatably mounted about a vertical axis 191 on an upper support 190 rigidly connected to the platform 19'. An electric motor (not illustrated) is associated with the support 190 for controlling the steering of the equipment of the front wheels RA about the vertical axis 191.

Of course, without prejudice to the principle of the invention, the details of construction and the embodiments may vary widely with respect to those described and illustrated purely by way of example, without departing from the scope of the present invention.

The invention claimed is:

1. A high mobility all-terrain vehicle (ATV) for emergency and rescue civil activities or for activities in the agricultural field or earth-moving activities, comprising:
   a vehicle structure, comprising at least one module for transporting persons and/or material,
   at least two front legs and at least two rear legs articulated to the vehicle structure and carrying respective track assemblies,
   each track assembly carrying a respective electric motor for actuating a track,
   each of said articulated front and rear legs comprising one or more articulated segments, and having a first end portion articulated to the vehicle structure and a second end portion articulated to the respective track assembly,
   the first end portion of each leg connected in an articulated manner to the vehicle structure both about a first axis, directed vertically with respect to the vehicle structure, and about a second axis, directed horizontally with respect to the vehicle structure, an actuator device for rotating the leg about said first axis, which can be actuated to vary the position of the leg about said first axis and to consequently vary the track width distance of the respective track assembly with respect to the median longitudinal plane of the vehicle structure, an actuator device for rotating the leg about said second axis, which can be actuated to vary the position of the leg about said second axis to vary accordingly the height of the vehicle structure with respect to the track assembly carried by said leg, the second end portion of each leg connected in an articulated manner to a supporting structure of the respective track assembly, both about a third axis, horizontally directed, and about a fourth axis, vertically directed, and about a fifth axis, directed parallelly to longitudinal direction of the track assembly, the articulation of the track assembly about said third horizontal axis being a freely rotatable articulation, which allows the track assembly to engage in a pitching-free movement to follow the contour of the ground while the vehicle is moving, an actuator device for rotating the track assembly about said fourth axis, which can be actuated to vary the position of the track assembly about said fourth axis to maintain the track assembly parallel to the vertical longitudinal plane of the vehicle structure when the track width distance of the track assembly with respect to the aforesaid median plane is varied, the articulation of the track assembly about said fifth longitudinal axis being a freely rotatable articulation, or an articulation with which one or more shock-absorbing devices are associated, or an articulation controlled by a respective actuator device.

2. A vehicle according to claim 1, further comprising at least two robotic manipulator arms carried by the structure of the vehicle adjacent to the front end of the vehicle, said at least two robotic manipulator arms having work tools.

3. A vehicle according to claim 2, wherein said work tools comprise gripping pliers or support members.

4. A vehicle according to claim 3, wherein said support members comprise support members for snow turbines, snowplows, excavation blades or shovels.

5. A vehicle according to claim 1, wherein each track assembly comprises:

the supporting structure including two parallel and spaced apart side walls, rigidly connected to each other, the electric motor for driving the track, having an inner stator and an outer rotor surrounding the stator, the stator being rigidly connected to a stationary shaft, having ends projecting from opposite sides of the electric motor and rigidly connected to said side walls of the supporting structure of the track assembly, near the front end of the track assembly, said rotor being rotatably connected with at least one front wheel for dragging the track, arranged coaxially with said rotor, a closed-loop track engaging about said at least one front wheel for dragging the track, about at least one rear wheel freely rotatably mounted on said supporting structure of the track assembly near the rear end of the track assembly, and on a set of freely rotatable wheels carried by said supporting structure on each side of the track assembly.

6. A vehicle according to claim 1, wherein the first end portion of each leg is mounted to articulate about said second axis on an intermediate support, which is mounted articulated about said first axis on a support module, rigidly connected, in a removable manner, to one side of the vehicle structure.

7. A vehicle according to claim 1, wherein the supporting structure of each track assembly is mounted to articulate about said fifth longitudinal axis on a support platform, and said support platform is rotatably mounted about said fourth vertical axis on a coupling member which is, in turn, mounted articulated about said third horizontal axis on the aforesaid second end of the respective articulated leg, and said support platform is retained on said coupling member by a quick-release coupling device.

8. A vehicle according to claim 7, wherein said quick-release coupling device comprises a coupling pin projecting axially upwards from said support platform, and rotatable thereto, and a plurality of gripping jaws movable radially on guides carried by said coupling member and movable between a radially outer release position, and a radially inner position, in which said gripping jaws axially retain an end bulb of said coupling pin, leaving said pin free to rotate with respect to said support platform about said fourth axis.

9. A vehicle according to claim 7, further comprising a wheel assembly configured to be coupled to a leg of said front and rear legs by said quick-release coupling device when a track assembly of the track assemblies is released from said quick-release coupling device.

10. A vehicle according to claim 1, further comprising one or more electronic control units, for controlling the actuator devices associated with the articulation axes of each articulated leg.

11. A vehicle according to claim 1, further comprising sensors for detecting the terrain contour in front of the vehicle, and one or more electronic control units are programmed to control the aforesaid actuator devices associated with the articulation axes of the legs of the vehicle according to output signals of said sensors, as well as according to one or more operating parameters of the vehicle, including a forward speed of the vehicle with respect to the ground.

12. A vehicle according to claim 1, further comprising an internal combustion engine used solely to drive an assembly of one or more electric generators for powering the electric motors for driving the track assemblies and for powering the actuator devices, and all on-board vehicle services that are electrically operated.

13. A vehicle according to claim 1, wherein the at least one module comprises a front module and a rear module connected in a mutually articulated way about a longitudinal axis.

14. A vehicle according to claim 1, further comprising a driving cabin connected to the vehicle structure in a rotatable manner about a transverse axis, the driving cabin being thus configured to be rotated downwards to allow full visibility of the ground in front of the vehicle when the vehicle takes on a very inclined upward attitude.

15. A vehicle according to claim 1, wherein the vehicle structure is configured as a hull suitable for floating and/or moving underwater, to allow an amphibious and/or underwater use of the vehicle, said structure being equipped below with a nozzle for the emission of a waterjet.

16. A vehicle according to claim 15, wherein each track assembly is equipped with a covering structure rotatable below the track to act as a floating hull.

* * * * *